United States Patent
Okabe et al.

(10) Patent No.: US 12,203,024 B2
(45) Date of Patent: *Jan. 21, 2025

(54) LIQUID CRYSTAL COMPOSITION AND LIQUID CRYSTAL ELEMENT

(71) Applicants: JNC CORPORATION, Tokyo (JP); JNC PETROCHEMICAL CORPORATION, Tokyo (JP)

(72) Inventors: Eiji Okabe, Chiba (JP); Takanori Mori, Chiba (JP); Kazushi Shiren, Chiba (JP); Yuko Katano, Chiba (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/167,072

(22) Filed: Feb. 10, 2023

(65) Prior Publication Data

US 2023/0265343 A1  Aug. 24, 2023

(30) Foreign Application Priority Data

Feb. 18, 2022 (JP) .................. 2022-023427
Jan. 5, 2023 (JP) .................. 2023-000542

(51) Int. Cl.
| | | |
|---|---|---|
| G02F 1/1333 | (2006.01) | |
| C09K 19/12 | (2006.01) | |
| C09K 19/18 | (2006.01) | |
| G02B 1/02 | (2006.01) | |
| G02B 1/04 | (2006.01) | |
| G02B 3/12 | (2006.01) | |
| G02F 1/139 | (2006.01) | |

(52) U.S. Cl.
CPC .............. *C09K 19/18* (2013.01); *C09K 19/12* (2013.01); *G02B 1/02* (2013.01); *G02B 1/041* (2013.01); *G02B 3/12* (2013.01); *G02F 1/1392* (2013.01); *C09K 2019/122* (2013.01); *C09K 2019/181* (2013.01); *C09K 2019/183* (2013.01); *C09K 2019/186* (2013.01); *C09K 2019/188* (2013.01)

(58) Field of Classification Search
CPC .. C09K 19/18; C09K 19/12; C09K 2019/181; C09K 2019/183; C09K 2019/188; G02F 1/1333
See application file for complete search history.

(56) References Cited

U.S. PATENT DOCUMENTS

| | | | | |
|---|---|---|---|---|
| 6,017,467 A | * | 1/2000 | Fujita | C07D 319/06 |
| | | | | 252/299.61 |
| 11,492,551 B2 | * | 11/2022 | Mori | C09K 19/3402 |
| 2020/0347301 A1 | * | 11/2020 | Brocke | C09K 19/12 |
| 2022/0119710 A1 | * | 4/2022 | Okabe | C09K 19/18 |
| 2023/0235228 A1 | * | 7/2023 | Li | C09K 19/04 |
| | | | | 252/299.63 |
| 2023/0265343 A1 | * | 8/2023 | Okabe | G02F 1/1392 |
| | | | | 252/299.66 |

FOREIGN PATENT DOCUMENTS

| | | | | |
|---|---|---|---|---|
| CN | 113528154 A | * | 10/2022 | ............. C09K 19/30 |
| JP | 2004285085 | | 10/2004 | |
| JP | 2011074074 | | 4/2011 | |
| WO | 2017201515 | | 11/2017 | |
| WO | 2017208996 | | 12/2017 | |
| WO | WO 2022/090098 A1 | * | 5/2022 | ............. C09K 19/04 |

OTHER PUBLICATIONS

Hiroshi Moritake, "Microwave / millimeter wave phase control device (1st) Microwave characteristics of liquid crystal display," EKISHO, vol. 23, Jan. 2019, with partial English translation thereof, pp. 1-7.

Yoshio Inuishi, "Dielectric Phenomenon Theory," Institute of Electrical Engineers of Japan, Ohmsha, Ltd., Jul. 1973, with partial English translation thereof, pp. 1-9.

* cited by examiner

*Primary Examiner* — Geraldina Visconti
(74) *Attorney, Agent, or Firm* — JCIPRNET

(57) ABSTRACT

A liquid crystal composition, which is a material used for an element for electromagnetic wave signal control in a frequency range of 1 GHz to 10 THz, satisfies at least one of characteristics such as a wide temperature range of a nematic phase and a large refractive index anisotropy and a small dielectric loss tangent (tan δ) in the frequency region used for control, and has an excellent balance of characteristics, and an element containing the composition. A liquid crystal composition including: at least one compound selected from the group consisting of compounds represented by Formula (1). For example, $R^1$ is C1-12 alkyl; $Z^{11}$ is a single bond; $L^{11}$, $L^{12}$, $L^{13}$ and $L^{18}$ are hydrogen; $L^{17}$ is methyl; $Y^{11}$ and $Y^{22}$ are hydrogen; and a, b, and c are respectively 0, 1, and 0.

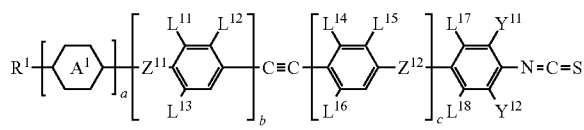

(1)

16 Claims, No Drawings

LIQUID CRYSTAL COMPOSITION AND LIQUID CRYSTAL ELEMENT

CROSS-REFERENCE TO RELATED APPLICATION

This application claims the priority benefit of Japan application serial no. 2022-023427, filed on Feb. 18, 2022, and the priority benefit of Japan application serial no. 2023-000542, filed on Jan. 5, 2023. The entirety of each of the above-mentioned patent applications is hereby incorporated by reference herein and made a part of this specification.

BACKGROUND

Technical Field

The disclosure relates to a liquid crystal composition having a nematic phase and positive dielectric anisotropy, and an element containing the same. The disclosure particularly relates to a liquid crystal composition used for controlling electromagnetic waves in a frequency range of 1 GHz to 10 THz, and an element containing the same.

Description of Related Art

As a new use of liquid crystal compositions widely used for displays, application of liquid crystal compositions to high-frequency technology such as antennas for transmitting and receiving electromagnetic waves has been attracting attention.

Specific examples of elements used for controlling electromagnetic waves in a frequency range of 1 GHz to 10 THz include millimeter-wave band or microwave band antennas and infrared laser elements. Various systems have been examined for these elements, but a system using a liquid crystal composition, which is thought to be less likely to fail because it has no mechanically movable parts, has been attracting attention.

A liquid crystal composition having dielectric anisotropy has different dielectric constants in vertical and horizontal directions with respect to an orientation direction of the liquid crystal composition at frequencies (from about several tens of kHz to several hundreds of MHz) lower than a frequency (relaxation frequency) at which orientational polarization is relaxed.

Even at frequencies higher than the relaxation frequency, that is, in a range from microwaves to terahertz waves (approximately 10 THz), a difference in dielectric constant between the vertical direction and the horizontal direction with respect to the orientation direction of the liquid crystal composition is observed, although the value is small. Therefore, the liquid crystal composition has dielectric anisotropy (Non-Patent Document 1). For this reason, the liquid crystal composition can change an orientation direction of molecules in response to an external field (electric field) to change the dielectric constant in one direction.

By utilizing this property, the liquid crystal composition can change orientation of molecules in response to an external electric field to change the dielectric constant. For example, it is possible to realize a microwave device that can electrically control transmission characteristics of a high-frequency transmission line from outside. As such devices, a voltage-controlled millimeter-wave band variable phase shifter in which a waveguide is filled with a nematic liquid crystal composition, a microwave/millimeter-wave band wideband variable phase shifter in which a nematic liquid crystal composition is used as a dielectric substrate for a microstrip line, and the like have been reported (Patent Documents 1 and 2).

In addition, in recent years, research on metamaterial technology, which exhibits behavior that is not found in natural substances against electromagnetic waves including light, has been progressing. Due to such a characteristic, the technology is applied to the technical fields of such as high-frequency devices, microwave devices, and antennas, and various electromagnetic wave control elements have been devised. As a capacitance control material for a transmission line using a metamaterial, use of a liquid crystal composition that can change orientation of molecules in response to an external electric field and change the dielectric constant has also been considered.

Elements used for such electromagnetic wave control desirably have characteristics such as high gain and low loss. Considering phase control of high-frequency signals, the characteristics required of a liquid crystal composition are: a large dielectric anisotropy that enables large phase control in a frequency region used for phase control; and a small dielectric loss tangent (tan δ) proportional to absorption energy of electromagnetic wave signals of the liquid crystal composition (Non-Patent Document 1).

Since a liquid crystal composition is a dielectric, it causes polarization (dielectric polarization) with respect to an external field (electric field). A dielectric constant is a physical quantity that indicates a response of the dielectric with respect to an electric field, and the magnitude of the dielectric constant is related to dielectric polarization. The mechanism by which dielectric polarization occurs is roughly divided into three. It includes electronic polarization, ionic polarization, and orientational polarization. Orientational polarization is polarization associated with orientation of a dipole moment, and as shown above, it relaxes at frequencies from about several hundreds of kHz to several hundreds of MHz, and the orientational polarization becomes small. As a result, dielectric polarization at high frequencies (range from microwaves to terahertz waves (approximately 10 THz)) involves only electronic polarization and ionic polarization. In a lossless dielectric, the relationship between a dielectric constant and refractive index is $\varepsilon = n^2$. If ionic polarization of a liquid crystal composition is considered to be small, it is thought that the larger the refractive index anisotropy (Δn) in visible light caused by electronic polarization, the larger the dielectric anisotropy (Δε) in a high-frequency region (Non-Patent Document 2). For this reason, a liquid crystal composition preferably has a large refractive index anisotropy.

In addition, a low drive voltage is desirable to realize switching characteristics and high energy efficiency of the elements. For this reason, a liquid crystal composition preferably has a large dielectric anisotropy even at low frequencies (frequencies lower than the relaxation frequency).

In addition, elements used for electromagnetic wave control are required to have a wide operating temperature range, a short response time, and the like. Liquid crystal compositions are also required to have characteristics such as a high upper limit temperature of a nematic phase, a low lower limit temperature of a nematic phase, stability against heat, and a low viscosity.

Liquid crystal compositions used in the conventional elements are disclosed in Patent Documents 3 and 4 below.

PATENT DOCUMENTS

[Patent Document 1] PCT International Publication No. WO 2017/201515
[Patent Document 2] PCT International Publication No. WO 2017/208996
[Patent Document 3] Japanese Patent Laid-Open No. 2004-285085
[Patent Literature 4] Japanese Patent Laid-Open No. 2011-74074

Non-Patent Documents

[Non-Patent Document 1] EKISHO, Vol. 23 (No. 1), (2019), pp. 51-55
[Non-Patent Document 2] Dielectric Phenomenon Theory, The Institute of Electrical Engineers of Japan, Ohmsha Ltd., Jul. 25, 1973, pp. 92-95

SUMMARY

As materials for elements used for electromagnetic wave control, liquid crystal compositions have a high upper limit temperature of a nematic phase and a low lower limit temperature of a nematic phase and have a large dielectric anisotropy (large refractive index anisotropy) and a small dielectric loss tangent (tan δ) in the frequency region for electromagnetic wave control and a large dielectric anisotropy at low frequencies for reducing drive voltage, and have been more preferably required to have a low viscosity, a high specific resistance in the drive frequency region, and stability against heat.

However, the conventional liquid crystal compositions used for display have poor characteristics as such liquid crystal compositions used in elements used for electromagnetic wave control. This is because they have poor characteristics, such as high insertion loss and/or poor phase shift, to be used for high-frequency control.

Liquid crystal materials for elements used for electromagnetic wave control are still developing, and attempts to develop novel compounds that enable optimization of such elements to improve the characteristics for high-frequency control have always been made. A unique liquid crystal medium is required for use as a material for elements used for electromagnetic wave control.

The disclosure provides: a liquid crystal composition having an excellent balance of characteristics and favorable requirement characteristics described above as a material used in elements for electromagnetic wave control in a frequency range of 1 GHz to 10 THz; and an element containing the composition.

The present inventors have conducted extensive studies, and as a result, they have found that a liquid crystal composition containing at least one compound selected from the group consisting of compounds represented by Formula (1) which are liquid crystalline compounds having a specific structure can solve the above-described problems, thus leading to realization of the disclosure.

The disclosure includes the following items.

Item 1. A liquid crystal composition including: at least one compound selected from the group consisting of compounds represented by Formula (1).

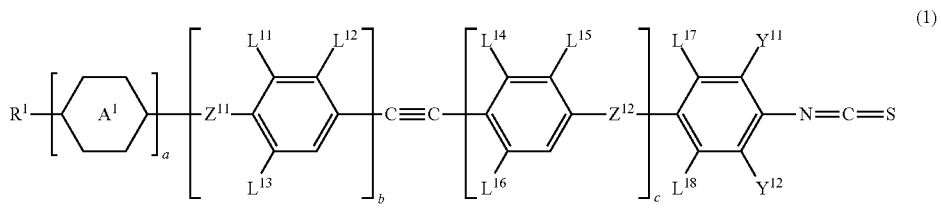

(1)

In Formula (1), $R^1$ is hydrogen, a halogen, or C1-12 alkyl in which at least one —$CH_2$— may be substituted with —O— or —S— and at least one —$(CH_2)_2$— may be substituted with —CH=CH— or —C≡C—, and at least one hydrogen in these groups may be substituted with a halogen; a ring $A^1$ is 1,4-cyclohexylene, 1,4-cyclohexenylene, tetrahydropyran-2,5-diyl, 1,3-dioxane-2,5-diyl, pyrimidine-2,5-diyl, 2,6,7-trioxabicyclo[2.2.2]octane-1,4-diyl, naphthalene-2,6-diyl, or pyridine-2,5-diyl, at least one hydrogen on these rings may be substituted with a halogen or C1-3 alkyl; $Z^{11}$ and $Z^{12}$ are a single bond, —CH=CH—, —CF=CF—, —C≡C—, or —C≡C—C≡C—; $L^{11}$, $L^{12}$, $L^{13}$, $L^{14}$, $L^{15}$, $L^{16}$, $L^{17}$, and $L^{18}$ are hydrogen, a halogen, C1-3 alkyl, or C3-5 cycloalkyl; $Y^{11}$ is hydrogen, a halogen, or C1-3 alkyl; $Y^{12}$ is hydrogen or a halogen; at least one of $L^{14}$, $L^{15}$, $L^{16}$, $L^{17}$, $L^{18}$, and $Y^{11}$ is C1-3 alkyl; and a and c are 0 or 1, b is 0, 1, or 2, and a sum of a, b, and c is 1 to 3, where when a is 0, b is 1, c is 0, $Z^{11}$ is a single bond, and $L^{11}$, $L^{12}$, $L^{13}$, $L^{17}$, $L^{18}$, and $Y^{12}$ are hydrogen, $Y^{11}$ is not methyl.

Item 2. The liquid crystal composition according to Item 1, further including: at least one compound selected from the group consisting of compounds represented by Formulae (2) and (3).

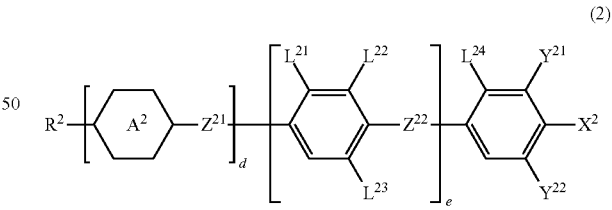

(2)

In Formula (2), $R^2$ is hydrogen, a halogen, or C1-12 alkyl in which at least one —$CH_2$— may be substituted with —O— or —S— and at least one —$(CH_2)_2$— may be substituted with —CH=CH— or —C≡C—, and at least one hydrogen in these groups may be substituted with a halogen; a ring $A^2$ is 1,4-cyclohexylene, 1,4-cyclohexenylene, tetrahydropyran-2,5-diyl, 1,3-dioxane-2,5-diyl, pyrimidine-2,5-diyl, 2,6,7-trioxabicyclo[2.2.2]octane-1,4-diyl, naphthalene-2,6-diyl, or pyridine-2,5-diyl, at least one hydrogen on these rings may be substituted with a halogen or C1-3 alkyl; $Z^{21}$ and $Z^{22}$ are a single bond, —C≡C— or —C≡C—C≡C—; $L^{21}$, $L^{22}$, $L^{23}$, and $L^{24}$ are hydrogen, a halogen, C1-3 alkyl, or C3-5 cycloalkyl; $X^2$ is —C≡C—CF$_3$ or —C≡C—C≡N; $Y^{21}$ and $Y^{22}$ are hydrogen, a halogen, or C1-3 alkyl; and d is 0 or 1, e is 0, 1, 2, or 3, and a sum of d and e is 1 to 3.

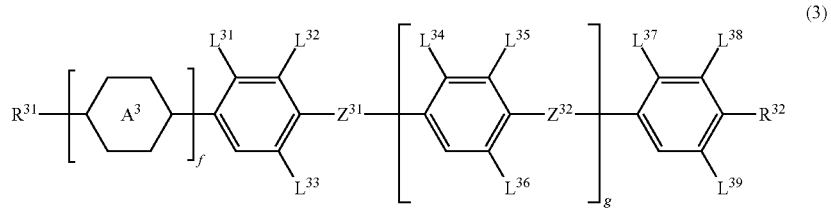

(3)

In Formula (3), $R^{31}$ is hydrogen or C1-12 alkyl, and in this alkyl, at least one —CH$_2$— may be substituted with —O— or —S— and at least one —(CH$_2$)$_2$— may be substituted with —CH=CH— or —C≡C—; $R^{32}$ is $R^{31}$ or —N=C=S; a ring $A^3$ is pyrimidine-2,5-diyl, naphthalene-2,6-diyl, or pyridine-2,5-diyl, and at least one hydrogen on these rings may be substituted with a halogen or C1-3 alkyl; $Z^{31}$ and $Z^{32}$ are a single bond, —C≡C— or —C≡C—C≡C—; $L^{31}$, $L^{32}$, $L^{33}$, $L^{34}$, $L^{35}$, $L^{36}$, $L^{37}$, $L^{38}$, and $L^{39}$ are hydrogen or a halogen; and f is 0 or 1, g is 0, 1, or 2, and a sum of f and g is 0 to 2.

Item 3. A liquid crystal composition according to Item 1 or 2, including: at least one compound selected from the group consisting of compounds represented by Formulae (1-1) to (1-6) as the compound represented by Formula (1).

In Formulae (1-1) to (1-6), $R^{1'}$ is C1-12 alkyl, and in this alkyl, at least one —(CH$_2$)$_2$— may be substituted with —CH=CH— or —C≡C—; $L^{31'}$, $L^{12'}$, $L^{13'}$, $L^{14'}$, $L^{15'}$, $L^{16'}$, $L^{17'}$, and $L^{18'}$ are hydrogen, fluorine, chlorine, methyl, ethyl, or cyclopropyl; $Y^{11'}$ is hydrogen, fluorine, chlorine, methyl, or ethyl; $Y^{12'}$ is hydrogen, fluorine, or chlorine; at least one of $L^{14'}$, $L^{15'}$, $L^{16'}$, $L^{17'}$, $L^{18'}$, and $Y^{11'}$ is methyl or ethyl; and here, in Formula (1-1), when $L^{11'}$, $L^{12'}$, $L^{13'}$, $L^{17'}$, $L^{18'}$, and $Y^{12'}$ are hydrogen, $Y^{11'}$ is not methyl.

Item 4. The liquid crystal composition according to any one of Items 1 to 3, in which a proportion of the compounds represented by Formula (1) is within a range of 5 weight % to 80 weight % based on a weight of the liquid crystal composition.

Item 5. The liquid crystal composition according to any one of Items 2 to 4, including: at least one compound

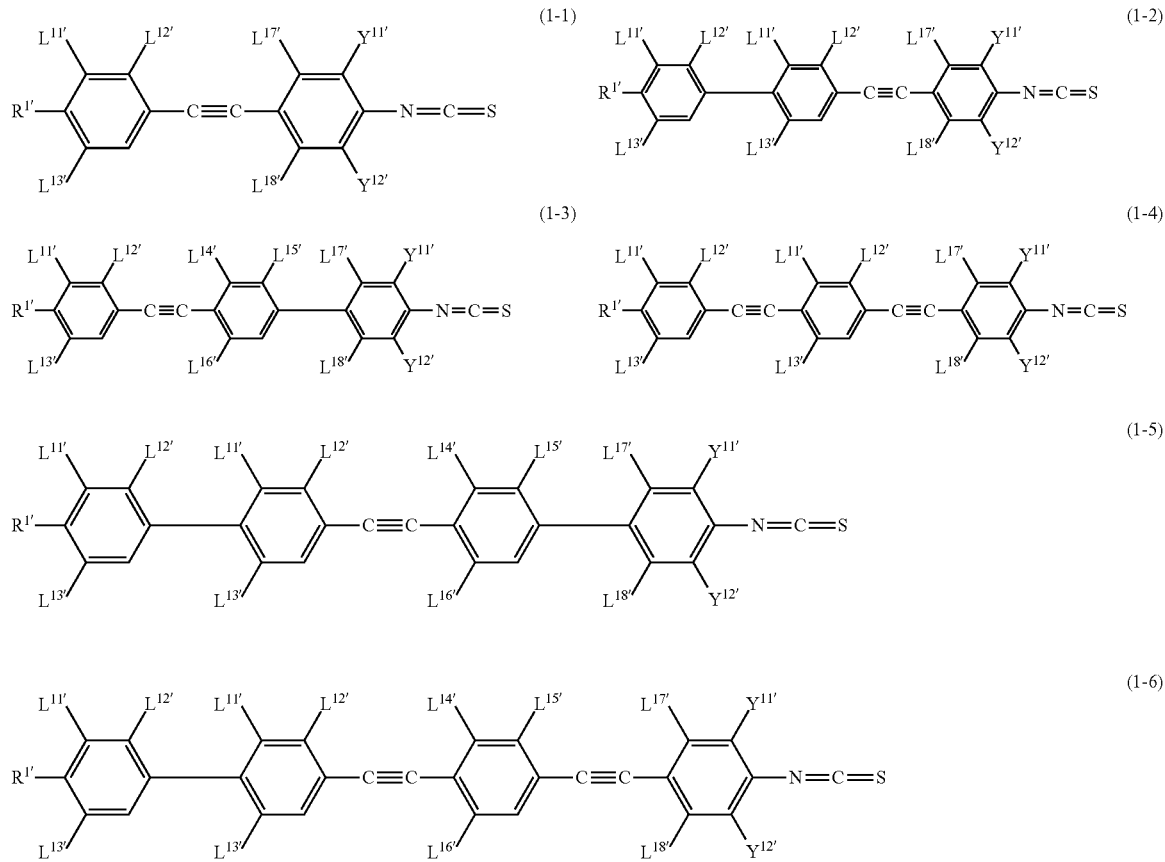

selected from the group consisting of compounds represented by Formulae (2-1) to (2-8) as the compound represented by Formula (2).

(2-1)
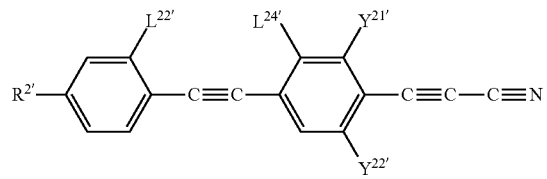

(2-2)
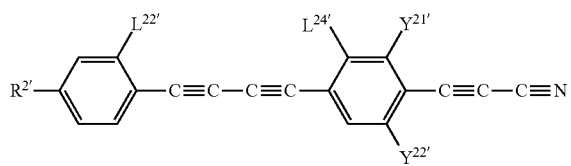

(2-3)
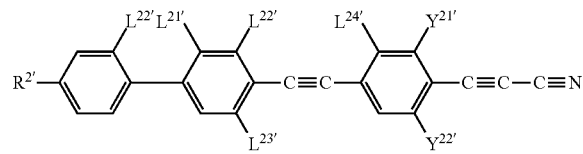

(2-4)
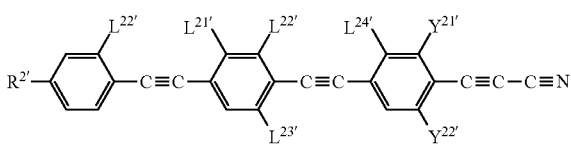

(2-5)
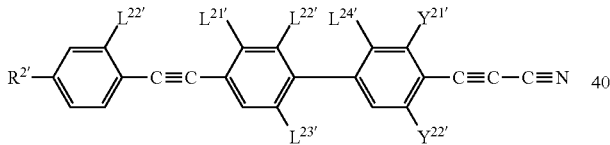

(2-6)
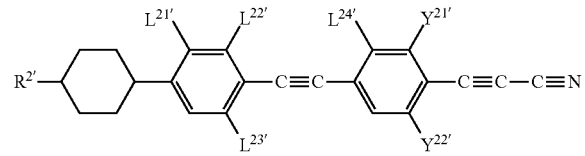

(2-7)
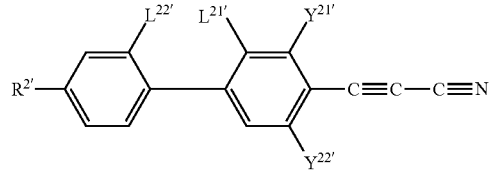

(2-8)
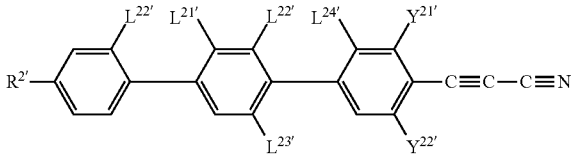

In Formulae (2-1) to (2-8), $R^{2'}$ is C1-12 alkyl, and in this alkyl, at least one —(CH$_2$)$_2$— may be substituted with —CH=CH— or —C≡C—; $L^{21'}$, $L^{22'}$, $L^{23'}$, and $L^{24'}$ are hydrogen, fluorine, chlorine, methyl, ethyl, or cyclopropyl; and $Y^{21'}$ and $Y^{22'}$ are hydrogen, fluorine, chlorine, methyl, or ethyl.

Item 6. The liquid crystal composition according to any one of Items 2 to 5, in which a proportion of the compounds represented by Formula (2) is within a range of 5 weight % to 50 weight % based on a weight of the liquid crystal composition.

Item 7. The liquid crystal composition according to any one of Items 2 to 6, including: at least one compound selected from the group consisting of compounds represented by Formulae (3-1) to (3-6) as the compound represented by Formula (3).

(3-2)
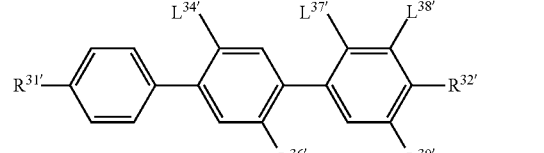

(3-1)
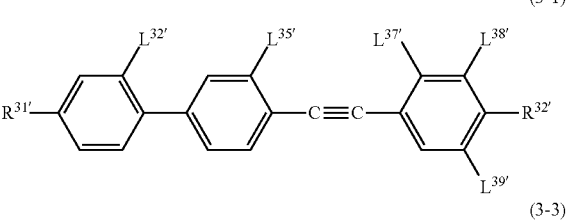

(3-3)
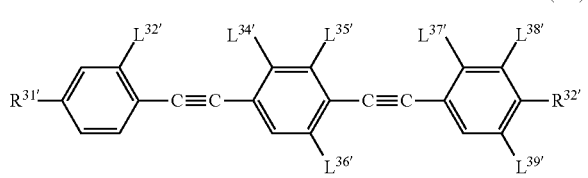

(3-4)
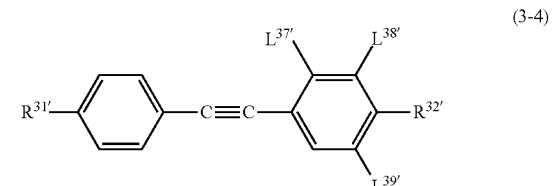

(3-5)
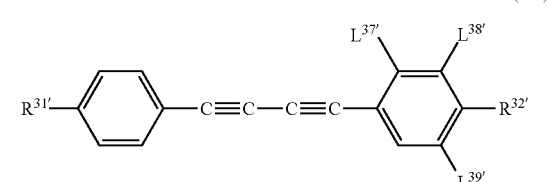

(3-6)
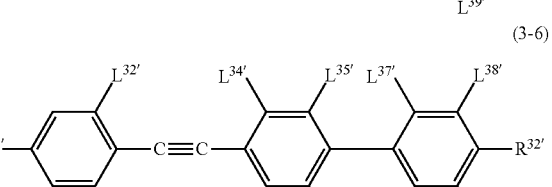

In Formulae (3-1) to (3-6), $R^{31'}$ is C1-12 alkyl, and in this alkyl, at least one —CH$_2$— may be substituted with —O— and at least one —(CH$_2$)$_2$— may be substituted with —CH=CH— or —C≡C—; R$^{32'}$ is R$^{31'}$ or —N=C=S; L$^{32'}$, L$^{34'}$, L$^{35'}$, L$^{36'}$, L$^{37'}$, L$^{38'}$, and L$^{39'}$ are hydrogen, fluorine, or chlorine; and in Formula (3-6), when L$^{35'}$, L$^{36'}$, L$^{38'}$, and L$^{39'}$ are hydrogen, R$^{32'}$ is —N=C=S.

Item 8. The liquid crystal composition according to any one of Items 2 to 7, in which a proportion of the compounds represented by Formula (3) is within a range of 5 weight % to 50 weight % based on a weight of the liquid crystal composition.

Item 9. The liquid crystal composition according to any one of Items 1 to 8, in which refractive index anisotropy at 25° C. at a wavelength of 589 nm is 0.35 or more.

Item 10. The liquid crystal composition according to any one of Items 1 to 9, in which dielectric anisotropy at 25° C. in a frequency range below 1 MHz is 5 or more.

Item 11. The liquid crystal composition according to any one of Items 1 to 10, in which dielectric anisotropy at 25° C. at least one frequency from 1 GHz to 10 THz is within a range of 0.50 to 3.0.

Item 12. The liquid crystal composition according to any one of Items 1 to 11, further including: an optically active compound.

Item 13. The liquid crystal composition according to any one of Items 1 to 12, further including: a polymerizable compound.

Item 14. The liquid crystal composition according to any one of Items 1 to 13, further including: at least one of an antioxidant, an ultraviolet absorber, an antistatic agent, and a dichroic dye.

Item 15. An element including: the liquid crystal composition according to any one of Items 1 to 14, in which the element is used for switching and is capable of reversibly controlling a dielectric constant by reversibly changing an orientation direction of liquid crystal molecules.

Item 16. An element including: the liquid crystal composition according to any one of Items 1 to 14, in which the element is used for controlling electromagnetic waves in a frequency range from 1 GHz to 10 THz.

Item 17. A liquid crystal lens or a birefringent lens for stereoscopic image display, including: the liquid crystal composition according to any one of Items 1 to 14.

According to the disclosure, while having a high upper limit temperature of a nematic phase and a low lower limit temperature of a nematic phase, at least one of the characteristics of the composition such as a large dielectric anisotropy and a small dielectric loss tangent (tan δ) in the frequency region for electromagnetic wave control and a large dielectric anisotropy at low frequencies for reducing drive voltage can be satisfied. Furthermore, at least one of the characteristics of the composition such as low viscosity, high specific resistance in the drive frequency region, and stability against heat can be further satisfied, whereby a more preferable liquid crystal composition can be provided. The element using the liquid crystal composition of the disclosure can exhibit excellent characteristics of being capable of controlling electromagnetic waves within a wide temperature range.

DESCRIPTION OF THE EMBODIMENTS

Terms used in this specification are as follows. The terms "liquid crystal composition" and "electromagnetic wave control element" are respectively sometimes abbreviated as "composition" and "element." "Electromagnetic wave control element" is a general term for an electromagnetic wave control panel and an electromagnetic wave control module.

"Liquid crystalline compound" is a general term for a compound having a liquid crystal phase such as a nematic phase or a smectic phase and a compound which does not have a liquid crystal phase but is mixed into a composition for the purpose of adjusting the characteristics such as dielectric anisotropy, a viscosity, and a temperature range of a liquid crystal phase. This compound has, for example, a 6-membered ring such as 1,4-cyclohexylene or 1,4-phenylene, and its molecules (liquid crystal molecules) are rod-like. "Polymerizable compound" is a compound added for the purpose of forming a polymer in a composition. A liquid crystalline compound having alkenyl is not classified as a polymerizable compound in that sense.

A liquid crystal composition is prepared by mixing a plurality of liquid crystalline compounds. The proportion (content) of the liquid crystalline compounds is represented by weight percentage (weight %) based on the weight of this liquid crystal composition. Additives such as an optically active compound, an antioxidant, an ultraviolet absorber, a stabilizer against ultraviolet rays or heat, a quencher, dyes (dichroic dyes), a defoamer, a polymerizable compound, a polymerization initiator, a polymerization inhibitor, an antistatic agent, and a magnetic compound are added to this liquid crystal composition as necessary. The proportion (addition amount) of the additives is represented by weight percentage (weight %) based on the weight of the liquid crystal composition similarly to the proportion of the liquid crystalline compounds. Parts per million (ppm) by weight are sometimes used. The proportions of a polymerization initiator and a polymerization inhibitor are exceptionally expressed based on the weight of the polymerizable compounds.

"Upper limit temperature of a nematic phase" is sometimes abbreviated as "upper limit temperature." "Lower limit temperature of a nematic phase" is sometimes abbreviated as "lower limit temperature." The expression of "increasing dielectric anisotropy" means that the value increases positively in a case of a composition with a positive dielectric anisotropy and means that the value increases negatively in a case of a composition with a negative dielectric anisotropy.

At least one compound selected from the group consisting of compounds represented by Formula (1) is sometimes abbreviated as "compounds (1)." "Compounds (1)" mean one or more compounds represented by Formula (1). The same applies to compounds represented by other formulae. "At least one" relating to "may be substituted" means that not only a position but also the number thereof may be selected without limitation.

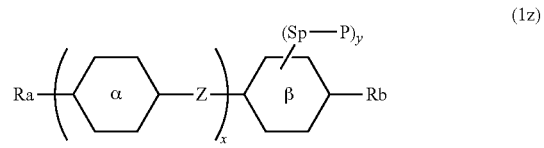

The above-described compound (1z) will be described as an example. In Formula (1z), the symbols α and β surrounded by hexagons correspond to a ring α and a ring β, respectively, and represent rings such as six-membered rings and condensed rings. When the subscript 'x' is 2, there are two rings α. Two groups represented by two rings α may be the same as or different from each other. This rule applies to a plurality of rings α when the subscript 'x' is greater than 2. This rule also applies to other symbols such as a bonding group Z. The slash across one side of the ring β indicates that arbitrary hydrogen on the ring β may be substituted with a substituent (-Sp-P). The subscript 'y' indicates the number of substituents substituted. When the subscript 'y' is 0, there is no such substitution. When the subscript 'y' is 2 or more, there are a plurality of substituents (-Sp-P) on the ring β. The rule that they "may be the same as or different from each other" also applies to this case. This rule also applies to a case where the symbol Ra is used for a plurality of compounds.

In Formula (1z), for example, an expression such as "Ra and Rb are alkyl, alkoxy, or alkenyl" means that Ra and Rb independently selected from the group consisting of alkyl, alkoxy, and alkenyl. Here, a group represented by Ra and a group represented by Rb may be the same as or different from each other. This rule also applies to a case where the symbol Ra is used for a plurality of compounds. This rule also applies to a case where a plurality of Ra's is used for one compound.

At least one compound selected from compounds represented by Formula (1z) is sometimes abbreviated as "compound (1z)." "Compounds (1z)" mean one compound represented by Formula (1z), a mixture of two compounds thereof, or a mixture of three or more compounds thereof. The same applies to compounds represented by other formulae. An expression "at least one compound selected from compounds represented by Formulae (1z) and (2z)" means at least one compound selected from the group consisting of compounds (1z) and (2z).

An expression "at least one 'A'" means that the number of 'A's is arbitrary. An expression "at least one 'A' may be substituted with 'B'" means that the position of 'A' is arbitrary when the number of 'A's is 1, and the positions of 'A's can be selected without limitation even when the number of 'A's is 2 or more. The expression "at least one —CH$_2$— may be substituted with —O—" is sometimes used. In this case, —CH$_2$—CH$_2$—CH$_2$— may be converted to —O—CH$_2$—O— by substituting non-adjacent —CH$_2$— with —O—. However, adjacent —CH$_2$— is not substituted with —O—. This is because —O—O—CH$_2$— (peroxide) is produced by this substitution.

Alkyl in a liquid crystalline compound is a linear or branched alkyl and does not include cycloalkyl unless otherwise specified. A linear alkyl is preferred over branched alkyl. The same applies to terminal groups such as alkoxy and alkenyl. The configuration of 1,4-cyclohexylene is preferably trans rather than cis to increase the upper limit temperature. 2-fluoro-1,4-phenylene means two divalent groups below. In the chemical formulae, fluorine may be directed leftward (L) or rightward (R). This rule also applies to divalent groups of asymmetric rings such as 2,5-difluoro-1,4-phenylene, 2,6-difluoro-1,4-phenylene, pyridine-2,5-diyl, pyrimidine-2,5-diyl, 1,3-dioxane-2,5-diyl, and tetrahydropyran-2,5-diyl. Preferred tetrahydropyran-2,5-diyl is directed rightward (R) to increase the upper limit temperature.

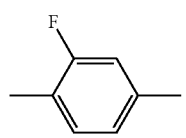 (L)

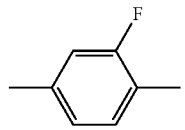 (R)

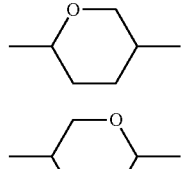 (L)

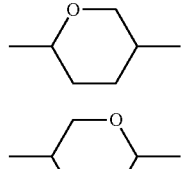 (R)

Benzo[b]thiophene-2,5-diyl and benzo[b]thiophene-2,6-diyl are respectively represented by the following structural formulae.

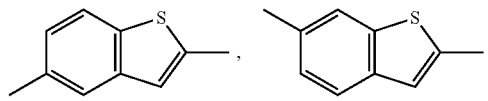

In a case where at least one hydrogen on these rings is substituted with a halogen or C1-3 alkyl, the following structures are preferred for ease of synthesis.

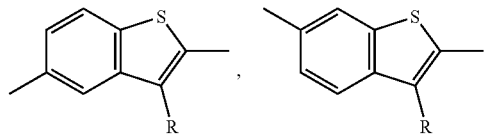

R is a halogen or C1-3 alkyl.

A bonding group such as carbonyloxy may similarly be —COO— or —OCO—.

In chemical formulae of component compounds, the symbol $R^1$ for a terminal group is used for a plurality of compounds. In these compounds, arbitrary two groups represented by $R^1$ may be the same as or different from each other. For example, there is a case where $R^{1'}$ of a compound (1-1) is methyl and $R^{1'}$ of a compound (1-2) is ethyl. There is also a case where $R^{1'}$ of the compound (1-1) is ethyl and $R^{1'}$ of a compound (1-2) is propyl. This rule also applies to symbols such as $R^2$, $R^{31}$, and $R^{32}$.

The disclosure also includes the following aspects. (a) The above-described composition further containing at least one selected from additives such as an optically active compound, an antioxidant, an ultraviolet absorber, a stabilizer against ultraviolet rays or heat, a quencher, dyes (dichroic dyes), a defoamer, a polymerizable compound, a polymerization initiator, a polymerization inhibitor, an antistatic agent, and a magnetic compound. (b) An element containing the above-described composition. (c) An element containing the above-described composition and used for controlling electromagnetic wave signals at least one frequency from 1 GHz to 10 THz. (d) The above-described composition further containing a polymerizable compound, and an element containing this composition. (e) Use of the above-described composition as a composition having a nematic phase. (f) Use of optically active composition obtained by adding an optically active compound to the above-described composition.

The liquid crystal composition of the disclosure has a small dielectric loss tangent (tan δ) and a large dielectric anisotropy in the frequency region of electromagnetic wave signals in the range of 1 GHz to 10 THz. For this reason, the liquid crystal composition of the disclosure can be suitably used in an element relating to electromagnetic waves (microwaves) not only in the range of 1 GHz to 10 THz but also in a range of 1 GHz to 10 GHz.

The composition of the disclosure will be described in the following order. First, configurations of component compounds of the composition will be described. Second, the main characteristics of the component compounds and the main effects of these compounds on the composition will be described. Third, the combination of components in the composition, preferred proportions of the components, and the reason thereof will be described. Fourth, a preferred embodiment of the component compounds will be described. Fifth, preferred component compounds will be shown. Sixth, additives which may be added to the composition will be described. Seventh, a method for synthesizing component compounds will be described. Finally, use of the composition will be described.

First, configurations of component compounds of the composition will be described. The composition of the disclosure is classified into a composition A and a composition B. The composition A may further contain, in addition to a liquid crystalline compound selected from a compound (1), a compound (2), and a compound (3), other liquid crystalline compounds, additives, and the like. "Other liquid crystalline compounds" are liquid crystalline compounds different from the compounds (1) to (3). Such compounds are incorporated in the composition to further adjust its characteristics. The additives include an optically active compound, an antioxidant, an ultraviolet absorber, a stabilizer against ultraviolet rays or heat, a quencher, dyes (dichroic dyes), a defoamer, a polymerizable compound, a polymerization initiator, a polymerization inhibitor, an antistatic agent, a polar compound, and the like.

The composition B consists substantially of the liquid crystalline compound selected from the compound (1), the compound (2), and the compound (3). "Substantially" means that the composition may contain additives, but does not contain other liquid crystalline compounds. The composition B has fewer components than the composition A. The composition B is preferred over the composition A from the viewpoint of cost reduction. The composition A is preferred over the composition B from the viewpoint that its characteristics can be further adjusted by incorporating other liquid crystalline compounds.

Second, the main characteristics of the component compounds and the main effects of these compounds on the characteristics of the composition will be described. The main characteristics of the component compounds are summarized in Table 1 based on the effect of the disclosure. Regarding the symbols in Table 1, L means large or high, M means medium, and S means small or low. The symbols L, M, and S are classifications based on qualitative comparisons among the component compounds, and 0 (zero) means that the corresponding value is approximately zero or close to zero.

TABLE 1

| Characteristics of compound | | | |
|---|---|---|---|
| Compound | (1) | (2) | (3) |
| Upper limit temperature | S to L | S to L | S to L |
| Viscosity | S to M | M to L | S to M |
| Refractive index anisotropy | L | L | L |
| Dielectric anisotropy | S to M | M to L | 0 to M |

The main effects of the component compounds on the characteristics of the composition when the component compounds are mixed with the composition are as follows.

The compound (1) mainly has an effect of increasing refractive index anisotropy of the liquid crystal composition and increasing dielectric anisotropy. By selecting the sum of a, b, and c in the compound (1), the upper limit temperature and the viscosity can be controlled to some extent. That is, when the sum of a, b, and c decreases, the upper limit temperature tends to decrease and the viscosity tends to decrease. When the sum of a, b, and c increases, the upper limit temperature tends to increase and the viscosity tends to increase. The specific resistance of the compound (1) tends to be generally low.

The compound (2) mainly has an effect of increasing refractive index anisotropy of the liquid crystal composition and increasing dielectric anisotropy more than the compound (1) does. A large dielectric anisotropy is preferable to realize high switching characteristics and high energy efficiency. The relationship between the viscosity, the upper limit temperature, and the number of rings (the sum of d and e in Formula (2)) contained in the compound has the same trend as the compound (1).

The compound (3) mainly has an effect of widening the temperature range of a nematic phase while increasing refractive index anisotropy. In addition, when $R^{32}$ is —N=C=S, there is an effect of increasing dielectric anisotropy. The relationship between the upper limit temperature, the viscosity, and the number of rings (the sum of f and g in Formula (3)) contained in the compound has the same trend as the compounds (1) and (2). However, the compound (3) tends to be more effective in increasing the upper limit temperature, lowering the lower limit temperature, and reducing the viscosity than the compounds (1) and (2).

Third, the combination of components in the composition, preferred proportions of the component compounds, and the reason thereof will be described. Preferred combinations of components in the composition are compound (1)+compound (2), compound (1)+compound (3), or compound (1)+compound (2)+compound (3). In addition, a composition consisting of only the compound (1) can also be prepared. A particularly preferred combination is compound (1)+compound (2)+compound (3) from the viewpoints of further reducing the viscosity and further increasing the refractive index anisotropy and the dielectric anisotropy.

Based on the weight of the liquid crystal composition, the preferred proportion of the compound (1) is within a range of about 5 weight % to about 80 weight % to widen the temperature range of a nematic phase while increasing the refractive index anisotropy and the dielectric anisotropy. A more preferred proportion thereof is within a range of about 10 weight % to about 70 weight %. A particularly preferred proportion is within a range of about 20 weight % to about 60 weight %.

Based on the weight of the liquid crystal composition, the preferred proportion of the compound (2) is within a range of about 5 weight % to about 50 weight % to increase the dielectric anisotropy and the refractive index anisotropy while suppressing an increase in the lower limit temperature. A more preferred proportion thereof is within a range of about 10 weight % to about 45 weight %. A particularly preferred proportion is within a range of about 15 weight % to about 40 weight %.

Based on the weight of the liquid crystal composition, the preferred proportion of the compound (3) is about 5 weight % or higher to widen the temperature range of a nematic phase while increasing the refractive index anisotropy and about 50 weight % or lower to increase the dielectric anisotropy. A more preferred proportion thereof is within a range of about 10 weight % to about 45 weight %. A particularly preferred proportion is within a range of about 15 weight % to about 40 weight %.

Fourth, a preferred embodiment of the component compounds will be described.

$R^1$ and $R^2$ are hydrogen, a halogen, or C1-12 alkyl in which at least one —$CH_2$— may be substituted with —O— or —S— and at least one —$(CH_2)_2$— may be substituted with —CH═CH— or —C≡C—, and at least one hydrogen in these groups may be substituted with a halogen.

$R^{31}$ and $R^{32}$ are hydrogen or C1-12 alkyl, and in this alkyl, at least one —$CH_2$— may be substituted with —O— or —S— and at least one —$(CH_2)_2$— may be substituted with —CH═CH— or —C≡C—.

In addition, $R^{32}$ is may be —N═C═S.

$R^1$, $R^2$, $R^{31}$, and $R^{32}$ are preferably methyl, ethyl, propyl, butyl, pentyl, hexyl, methoxy, or ethoxy to improve stability against ultraviolet rays or heat. Methyl, ethyl, propyl, butyl, pentyl, methoxy, or ethoxy is preferable to reduce the viscosity.

$R^{32}$ is also preferably —N═C═S to increase refractive index anisotropy or dielectric anisotropy.

a and c are 0 or 1, b is 0, 1, or 2, and the sum of a, b, and c is 1 to 3. a is preferably 0 to increase the refractive index anisotropy and reduce the viscosity and 1 to lower the lower limit temperature. b is preferably 1 to lower the lower limit temperature and reduce the viscosity and 2 to increase the refractive index anisotropy and the upper limit temperature. c is preferably 0 to lower the lower limit temperature and reduce the viscosity and 1 to increase the refractive index anisotropy and the upper limit temperature. The sum of a, b, and c is preferably 2 or 3 to increase the refractive index anisotropy and the upper limit temperature.

When a is 0, b is 1, c is 0, $Z^{11}$ is a single bond, and $L^{11}$, $L^{12}$, $L^{13}$, $L^{17}$, $L^{18}$, and $Y^{12}$ are hydrogen, $Y^{11}$ is not methyl.

d is 0 or 1, e is 0, 1, 2, or 3, and the sum of d and e is 1 to 3. d is preferably 0 to increase the refractive index anisotropy and reduce the viscosity and 1 to lower the lower limit temperature. e is preferably 1 to lower the lower limit temperature and reduce the viscosity and 2 or 3 to increase the refractive index anisotropy and the upper limit temperature. The sum of d and e is preferably 2 or 3 to increase the refractive index anisotropy and the upper limit temperature.

f is 0 or 1, g is 0, 1, or 2, and the sum of f and g is 0 to 2. f is preferably 0 to increase the refractive index anisotropy and reduce the viscosity. g is preferably 0 to lower the lower limit temperature and reduce the viscosity and 1 or 2 to increase the refractive index anisotropy and the upper limit temperature. The sum of f and g is preferably 1 or 2 to increase the refractive index anisotropy and the upper limit temperature.

$Z^{11}$ and $Z^{12}$ are a single bond, —CH═CH—, —CF═CF—, —C≡C—, or —C≡C—C≡C—. $Z^{11}$ and $Z^{12}$ are preferably a single bond to reduce the viscosity and —CH═CH— or —C≡C— to increase the refractive index anisotropy.

$Z^{21}$ and $Z^{22}$ are a single bond, —C≡C— or —C≡C—C≡C—. $Z^{21}$ and $Z^{22}$ are preferably a single bond to reduce the viscosity and —C≡C— or —C≡C—C≡C— to increase the refractive index anisotropy.

$Z^{31}$ and $Z^{32}$ are a single bond, —C≡C— or —C≡C—C≡C—. $Z^{31}$ and $Z^{32}$ are preferably a single bond to reduce the viscosity and —C≡C— or —C≡C—C≡C— to increase the refractive index anisotropy.

Rings $A^1$ and $A^2$ are 1,4-cyclohexylene, 1,4-cyclohexenylene, tetrahydropyran-2,5-diyl, 1,3-dioxane-2,5-diyl, pyrimidine-2,5-diyl, 2,6,7-trioxabicyclo[2.2.2]octane-1,4-diyl, naphthalene-2,6-diyl, or pyridine-2,5-diyl, at least one hydrogen on these rings may be substituted with a halogen or C1-3 alkyl.

Rings $A^1$ and $A^2$ are 1,4-cyclohexylene, pyrimidine-2,5-diyl naphthalene-2,6-diyl, or pyridine-2,5-diyl. 1,4-cyclohexylene is more preferable.

A ring $A^3$ is pyrimidine-2,5-diyl, naphthalene-2,6-diyl, or pyridine-2,5-diyl, and at least one hydrogen on these rings may be substituted with a halogen or C1-3 alkyl.

$L^{11}$, $L^{12}$, $L^{13}$, $L^{14}$, $L^{15}$, $L^{16}$, $L^{17}$, $L^{18}$, $L^{21}$, $L^{22}$, $L^{23}$, and $L^{24}$ are hydrogen, a halogen, C1-3 alkyl, or C3-5 cycloalkyl. $L^{11}$, $L^{12}$, $L^{13}$, $L^{14}$, $L^{15}$, $L^{16}$, $L^{17}$, $L^{18}$, $L^{21}$, $L^{22}$, $L^{23}$, and $L^{24}$ are preferably hydrogen to increase the upper limit temperature, fluorine or chlorine to increase the dielectric anisotropy, and fluorine, chlorine, methyl, ethyl, or cyclopropyl to lower the lower limit temperature. In order to increase the dielectric anisotropy of the entire liquid crystal composition, $L^{11}$ and $L^{12}$, $L^{13}$ and $L^{14}$, or $L^{21}$ and $L^{22}$ are preferably not a halogen at the same time.

$L^{31}$, $L^{32}$, $L^{33}$, $L^{34}$, $L^{35}$, $L^{36}$, $L^{37}$, $L^{38}$, and $L^{39}$ are hydrogen or a halogen. $L^{31}$, $L^{32}$, $L^{33}$, $L^{34}$, $L^{35}$, $L^{36}$, $L^{37}$, $L^{38}$, and $L^{39}$ are preferably hydrogen to increase the upper limit temperature and fluorine or chlorine to increase the dielectric anisotropy and lower the lower limit temperature. In order to increase the dielectric anisotropy of the entire liquid crystal composition, $L^{31}$ and $L^{32}$, $L^{34}$ and $L^{35}$, or $L^{37}$ and $L^{38}$ are preferably not a halogen at the same time.

$Y^{11}$ is hydrogen, a halogen, or C1-3 alkyl. $Y^{11}$ is preferably hydrogen to increase the refractive index anisotropy and methyl or ethyl to lower the lower limit temperature. $Y^{12}$ is hydrogen or a halogen. $Y^{12}$ is preferably hydrogen to increase the refractive index anisotropy and fluorine or chlorine to increase the dielectric anisotropy.

$Y^{21}$ and $Y^{22}$ are hydrogen, a halogen, or C1-3 alkyl. $Y^{21}$ and $Y^{22}$ is preferably hydrogen to increase the refractive index anisotropy, fluorine or chlorine to increase the dielectric anisotropy, and methyl or ethyl to lower the lower limit temperature.

$X^2$ is —C≡C—$CF_3$ or —C≡C—C≡N. $X^2$ is preferably —C≡C—C≡N to increase the refractive index anisotropy.

Fifth, preferred component compounds will be shown.

Preferred compounds (1) are compounds (1-1) to (1-6).

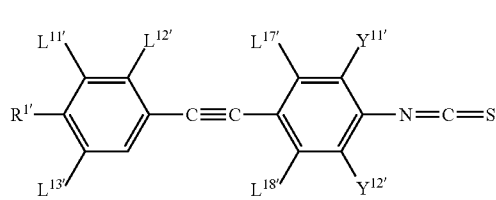

(1-1)

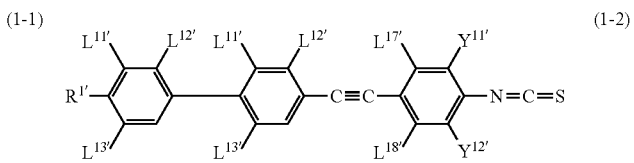

(1-2)

-continued

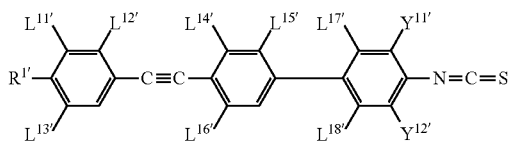
(1-3)

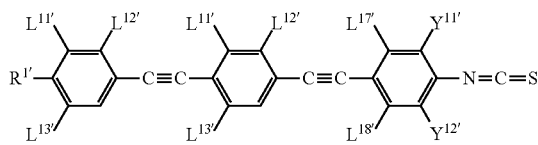
(1-4)

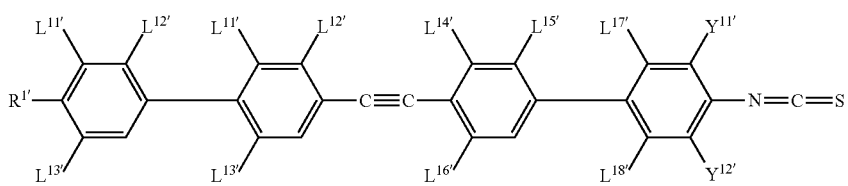
(1-5)

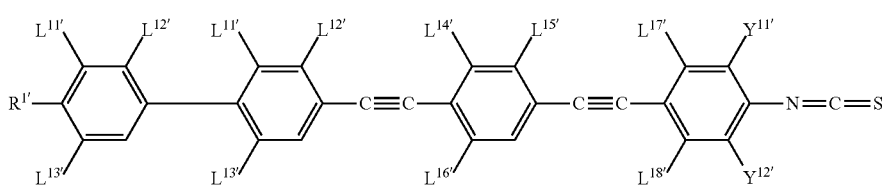
(1-6)

In Formulae (1-1) to (1-6), $R^{1'}$ is C1-12 alkyl, and in this alkyl, at least one $-(CH_2)_2-$ may be substituted with $-CH=CH-$ or $-C\equiv C-$; $L^{11'}$, $L^{12'}$, $L^{13'}$, $L^{14'}$, $L^{15'}$, $L^{16'}$, $L^{17'}$, and $L^{18'}$ are hydrogen, fluorine, chlorine, methyl, ethyl, or cyclopropyl; $Y^{11'}$ is hydrogen, fluorine, chlorine, methyl, or ethyl; $Y^{12'}$ is hydrogen, fluorine, or chlorine; at least one of $L^{14'}$, $L^{15'}$, $L^{16'}$, $L^{17'}$, $L^{18'}$, and $Y^{11'}$ is methyl or ethyl; and here, in Formula (1-1), when $L^{11'}$, $L^{12'}$, $L^{13'}$, $L^{17'}$, $L^{18'}$, and $Y^{12'}$ are hydrogen, $Y^{11'}$ is not methyl.

At least one compound (1) is preferably the compound (1-1), the compound (1-2), the compound (1-4), or the compound (1-5).

Preferred compounds (2) are compounds (2-1) to (2-8).

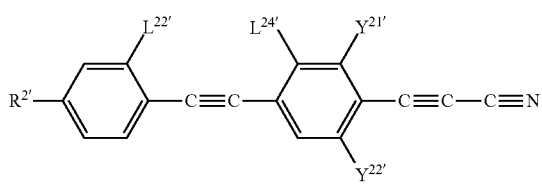
(2-1)

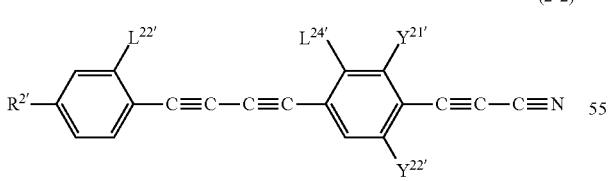
(2-2)

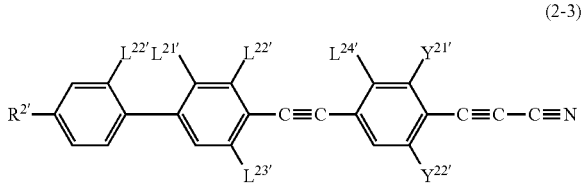
(2-3)

-continued

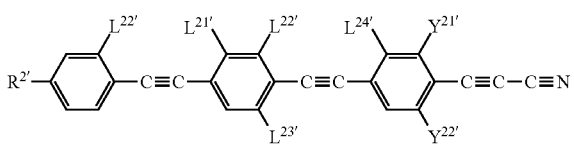
(2-4)

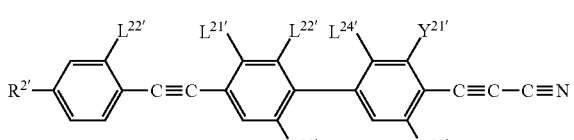
(2-5)

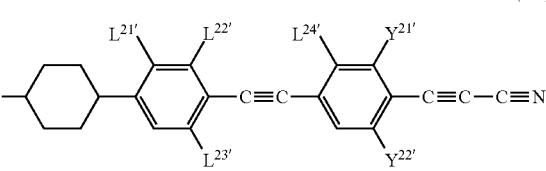
(2-6)

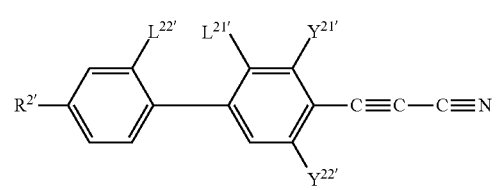
(2-7)

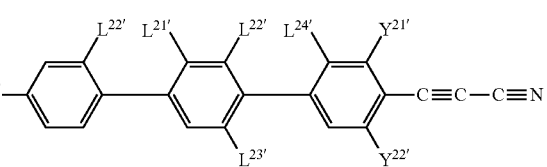
(2-8)

In Formulae (2-1) to (2-8), $R^{2'}$ is C1-12 alkyl, and in this alkyl, at least one $-(CH_2)_2-$ may be substituted with $-CH=CH-$ or $-C\equiv C-$; $L^{21'}$, $L^{22'}$, $L^{23'}$, and $L^{24'}$ are hydrogen, fluorine, chlorine, methyl, ethyl, or cyclopropyl; and $Y^{21'}$ and $Y^{22'}$ are hydrogen, fluorine, chlorine, methyl, or ethyl.

At least one compound (2) is preferably the compound (2-1), the compound (2-3), or the compound (2-4).

Preferred compounds (3) are compounds (3-1) to (3-6).

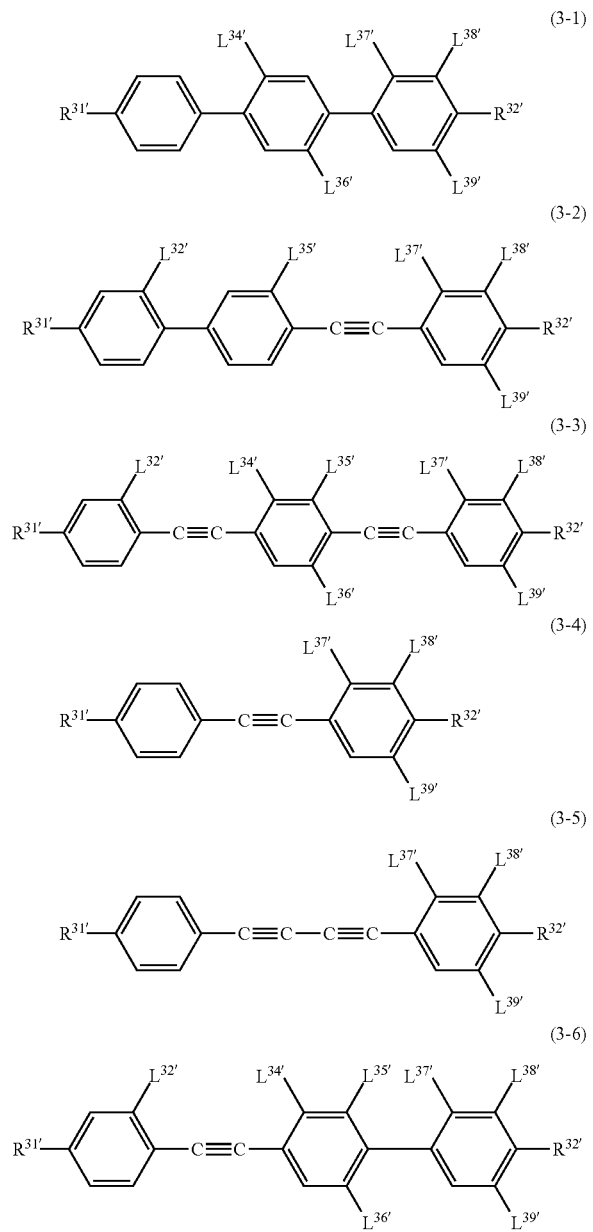

In Formulae (3-1) to (3-6), $R^{31'}$ is C1-12 alkyl, and in this alkyl, at least one —$CH_2$— may be substituted with —O— and at least one —$(CH_2)_2$— may be substituted with —CH=CH— or —C≡C—; $R^{32'}$ is $R^{31'}$ or —N=C=S; $L^{32'}$, $L^{34'}$, $L^{35'}$, $L^{36'}$, $L^{37'}$, $L^{38'}$, and $L^{39'}$ are hydrogen, fluorine, or chlorine; and in Formula (3-6), when $L^{35'}$, $L^{36'}$, $L^{38'}$, and $L^{39'}$ are hydrogen, $R^{32'}$ is —N=C=S.

At least one compound (3) is preferably the compound (3-2), the compound (3-3), the compound (3-4), or the compound (3-5). At least two compounds (3) are more preferably a combination of the compound (3-2) and the compound (3-4) or a combination of the compound (3-3) and the compound (3-4).

Sixth, additives which may be added to the composition will be described. Such additives include an optically active compound, an antioxidant, an ultraviolet absorber, a stabilizer against ultraviolet rays or heat, a quencher, dyes (dichroic dyes), a defoamer, a polymerizable compound, a polymerization initiator, a polymerization inhibitor, an antistatic agent, a polar compound, and the like. Hereinafter, the mixing proportion of these additives is a proportion (weight) based on the weight of the liquid crystal composition unless otherwise specified.

Any combination of additives may be used, and for example, it is also possible to use a combination of different types of antioxidants. For example, it is also possible to use a combination of different types of additives, for example, a combination of an antioxidant, an ultraviolet absorber, and a stabilizer.

An optically active compound is added to the composition for the purpose of inducing a helical structure of liquid crystals to give a twist angle. Examples of such a compound include compounds (4-1) to (4-5). A preferred proportion of the optically active compound is about 5 weight % or less. A more preferred proportion thereof is within a range of about 0.01 weight % to about 2 weight %.

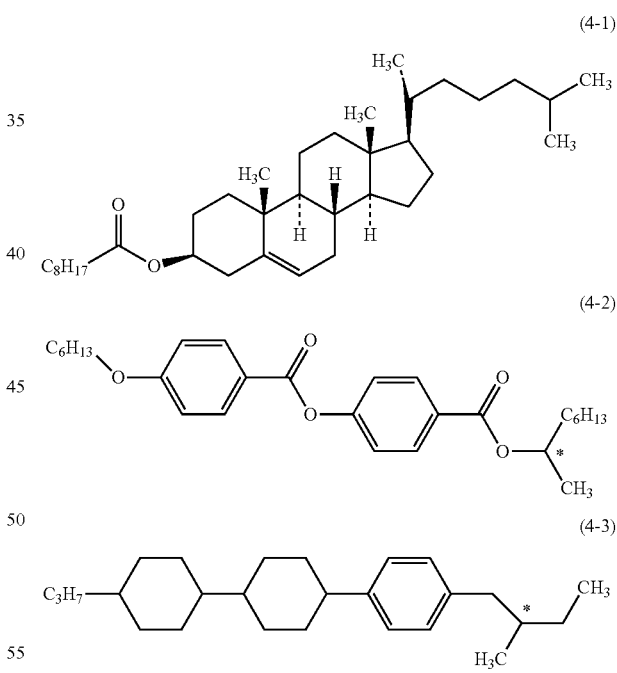

-continued (4-5)

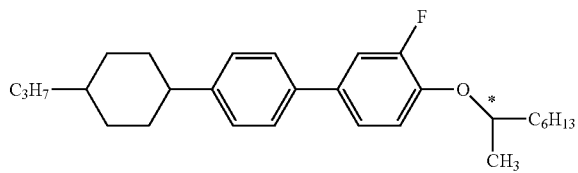

In order to prevent a decrease in specific resistance due to heating in atmospheric air or to maintain a large voltage holding ratio not only at room temperature but also at temperatures close to the upper limit after long-term use of an element, an antioxidant is added to the composition. Preferred examples of antioxidants include a compound (5) in which t is an integer of 1 to 9.

(5)

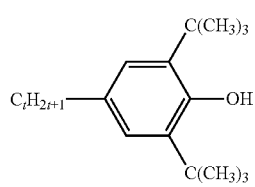

In the compound (5), t is preferably 1, 3, 5, 7, or 9. t is more preferably 7. Since the compound (5) in which t is 7 has low volatility, it is effective to maintain a large voltage holding ratio not only at room temperature but also at temperatures close to the upper limit after long-term use of an element. A preferred proportion of an antioxidant is about 50 ppm or higher to obtain its effect and about 600 ppm or lower not to lower the upper limit temperature or increase the lower limit temperature. A more preferred proportion thereof is within a range of about 100 ppm to about 300 ppm.

Preferred examples of ultraviolet absorbers include benzophenone derivatives, benzoate derivatives, and triazole derivatives. Light stabilizers such as sterically hindered amines are also preferable. Preferred examples of light stabilizers include compounds (6-1) to (6-16). A preferred proportion of such an absorber or a stabilizer is about 50 ppm or higher to obtain its effect and about 10,000 ppm or lower not to lower the upper limit temperature or increase the lower limit temperature. A more preferred proportion thereof is within a range of about 100 ppm to about 10,000 ppm.

(6-1)

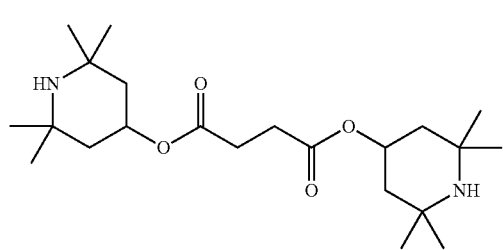

(6-2)

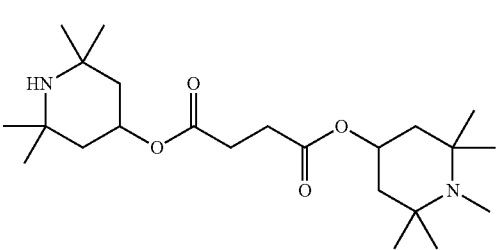

(6-3)

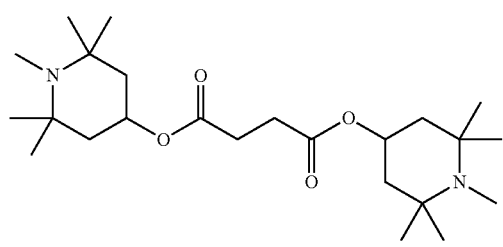

(6-4)

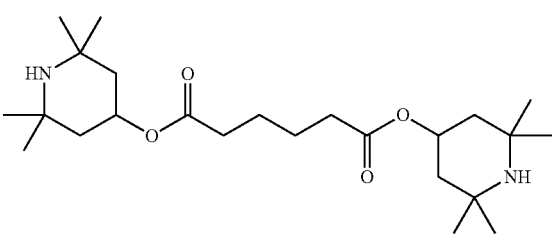

(6-5)

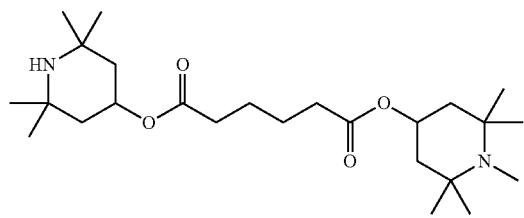

(6-6)

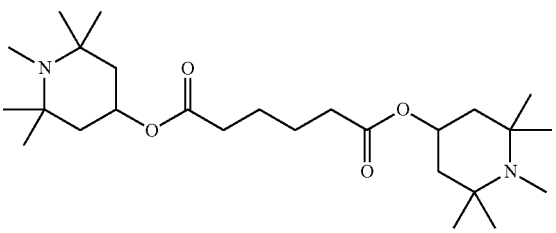

(6-7)
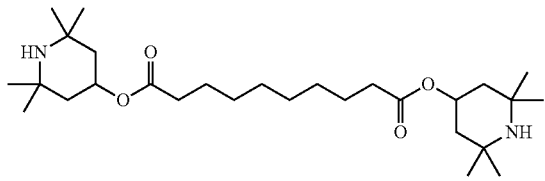
(6-8)
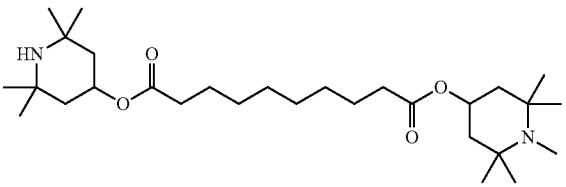
(6-9)
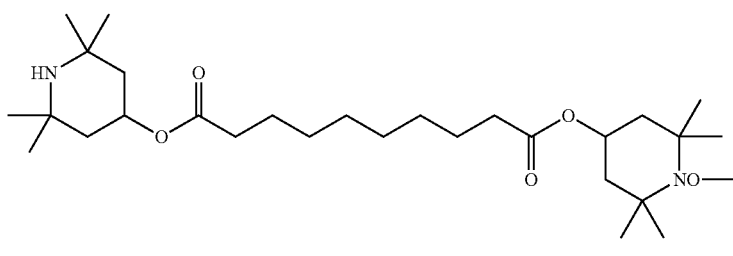
(6-10)
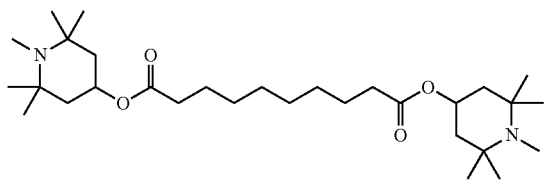
(6-11)
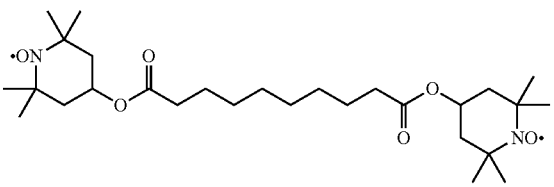
(6-12)
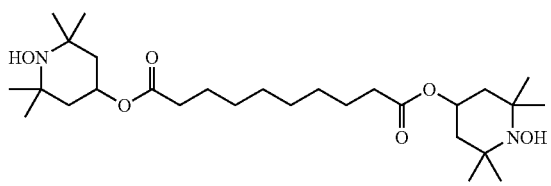
(6-13)
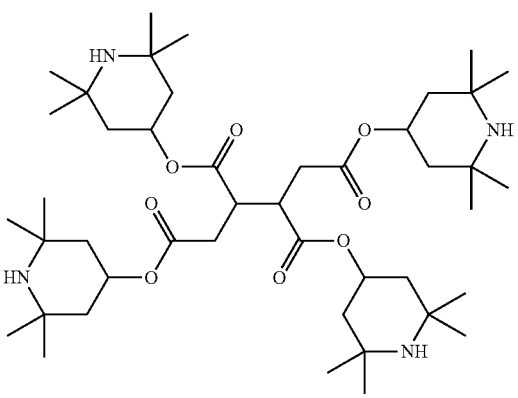
(6-14)
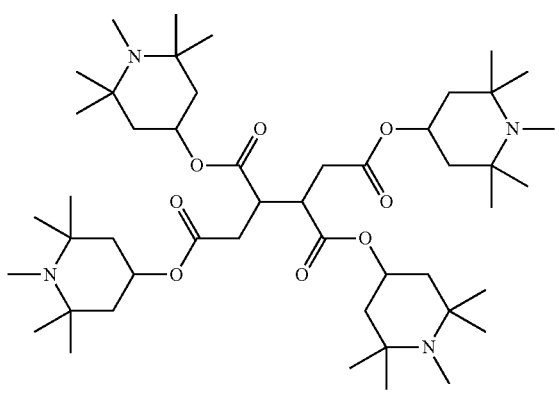
(6-15)
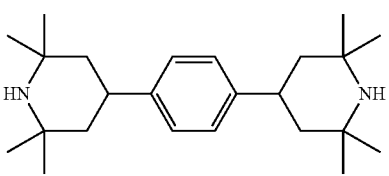

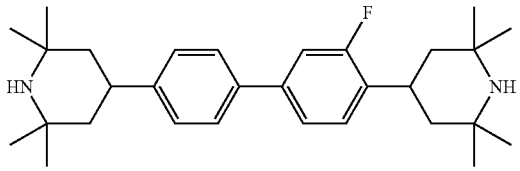

(6-16)

Additives preferred as stabilizers against ultraviolet rays or heat include amino-tolane compounds represented by a compound (7) (U.S. Pat. No. 6,495,066B).

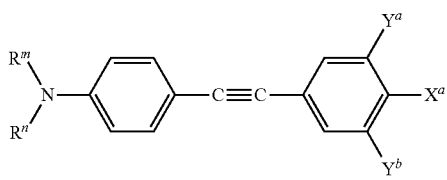

(7)

In Formula (7), $R^m$ and $R^n$ are C1-12 alkyl, C1-12 alkoxy, C2-12 alkenyl, or C2-12 alkenyloxy; $X^a$ is —$NO_2$, —C≡N, —N═C═S, fluorine, or —$OCF_3$; $Y^a$ and $Y^b$ are hydrogen or fluorine. The proportion of these stabilizers is preferably within a range of 1 to 20 weight % and more preferably within a range of 5 to 10 weight % to obtain their effects.

A quencher is a compound that receives light energy absorbed by a liquid crystalline compound and converts it to heat energy to prevent decomposition of a liquid crystalline compound. A preferred proportion of such a quencher is about 50 ppm or higher to obtain its effect and about 20,000 ppm or lower to lower the lower limit temperature. A more preferred proportion thereof is within a range of about 100 ppm to about 10,000 ppm.

Dichroic dyes such as azo dyes, anthraquinone dyes are added to the composition to make it suitable for guest host (GH) mode elements. The preferred proportion of the dyes is within a range of about 0.01 weight % to about 10 weight %. Defoamers such as dimethyl silicone oil, and methylphenyl silicone oil are added to the composition to prevent foaming. A preferred proportion of such a defoamer is about 1 ppm or higher to obtain its effect and about 1,000 ppm or lower to prevent display defects. A more preferred proportion thereof is within a range of about 1 ppm to about 500 ppm.

A polymerizable compound is added to the composition to make it suitable for polymer-stabilized elements. Preferred examples of polymerizable compounds include polymerizable groups such as acrylates, methacrylates, vinyl compounds, vinyloxy compounds, propenyl ethers, epoxy compounds (oxiranes and oxetanes), and vinyl ketone. More preferred examples include derivatives of acrylates or methacrylates. A preferred proportion of a polymerizable compound is about 0.05 weight % or more to obtain its effect and about 20 weight % or less to prevent an increase in driving temperature. A more preferred proportion thereof is within a range of about 0.1 weight % to about 10 weight %. The polymerizable compound is polymerized through ultraviolet irradiation. Polymerization may be carried out in the presence of a polymerization initiator such as a photopolymerization initiator. Suitable conditions for polymerization, suitable types of initiators, and suitable amounts thereof are known to those skilled in the art and described in documents.

For example, photopolymerization initiators Irgacure 651 (registered trademark; BASF), Irgacure 184 (registered trademark; BASF), and Darocure 1173 (registered trademark; BASF) are appropriate for radical polymerization. A preferred proportion of a photopolymerization initiator is within a range of about 0.1 parts by weight to about 5 parts by weight based on 100 parts by weight of a polymerizable compound. A more preferred proportion thereof is within a range of about 1 part by weight to about 3 parts by weight.

A polymerization inhibitor may be added to prevent polymerization during storage of a polymerizable compound. A polymerizable compound is usually added to the composition without removing a polymerization inhibitor. Examples of polymerization inhibitors include hydroquinone, hydroquinone derivatives such as methylhydroquinone, 4-tert-butylcatechol, 4-methoxyphenol, and phenothiazine.

A polar compound in this specification is an organic compound having polarity and does not contain a compound having an ionic bond. Atoms such as oxygen, sulfur, and nitrogen are more electronegative and tend to have a partial negative charge. Carbon and hydrogen tend to be neutral or have a partial positive charge. Polarity results from uneven distribution of partial charges between different atoms in a compound. For example, a polar compound has at least one substructure such as —OH, —COOH, —SH, —$NH_2$, >NH, and >N—.

Seventh, a method for synthesizing component compounds will be described. Such compounds can be synthesized through methods disclosed in books such as Organic Synthesis (John Wiley & Sons, Inc.), Organic Reactions (John Wiley & Sons, Inc.), Comprehensive Organic Synthesis (Pergamon Press), and New Experimental Chemistry Course (Maruzen). Compositions are prepared through known methods from the compounds obtained in this manner. For example, the component compounds are mixed and dissolved together by heating.

Finally, use of the composition will be described. Since the composition of the disclosure has a lower limit temperature of about −10° C. or lower and an upper limit temperature of about 70° C. or higher, it can be used not only as a composition having a nematic phase but also as an optically active composition by adding optically active compounds.

An oriented liquid crystal composition has different dielectric constants in vertical and horizontal directions. For this reason, it has a characteristic of dielectric anisotropy.

Not only antenna elements but also elements using a liquid crystal composition are generally elements in which a liquid crystal composition layer is sandwiched between two substrates and liquid crystal molecules are aligned (oriented) in one direction due to orientation films at interfaces. In a case where there is no external field, liquid crystal molecules in an element are aligned in one direction due to orientation control force of orientation films. However, when an external field is applied, the liquid crystal molecules in the element deviate from the alignment of the orientation films and face the direction of the external field. In addition, when the external field is removed again, the liquid crystal molecules return to their original states of being aligned in one direction due to the orientation control force of the orientation films. In this manner, the orientation of the liquid crystal molecules in the element can be controlled by the orientation and size of the external field, thereby controlling the inclination (angle) of the liquid crystal molecules in the element with respect to one direction. Since the liquid crystal composition has dielectric anisotropy, it is possible to control the dielectric constant of the liquid crystal composition layer in the element in one direction by controlling the angle of the liquid crystal molecules in the element with respect to one direction. For example, if the dielectric constant of a liquid crystal composition layer in an element in one direction when there is no external field is a dielectric constant in the vertical direction of the liquid crystal composition, an external field can be applied thereto perpendicularly to the one direction to change the dielectric constant to a dielectric constant in the horizontal direction of the liquid crystal composition.

In this manner, the liquid crystal composition of the disclosure can be used in a switching element capable of reversibly controlling a dielectric constant by reversibly changing the orientation direction of liquid crystal molecules.

Angles of liquid crystal molecules in an element can be controlled using an electric field as an external field. A voltage required to drive liquid crystal molecules is a drive voltage. In order to control angles of liquid crystal molecules, it is required for dielectric anisotropy at 25° C. to be at least 2 within a frequency range below 1 MHz of a liquid crystal composition. In order to further reduce the drive voltage, it is necessary to increase the dielectric anisotropy at 25° C. within a frequency range below 1 MHz, and 5 or more is preferable and 10 or more is more preferable.

As described above, the larger the refractive index anisotropy ($\Delta n$) in visible light (for example, a wavelength of 589 nm), the larger the dielectric anisotropy ($\Delta \varepsilon$) in the high-frequency region (range from microwaves to terahertz waves (approximately 10 THz)). The liquid crystal composition containing the compounds represented by General Formula (1) of the disclosure preferably has a refractive index anisotropy ($\Delta n$) of 0.25 or more at 25° C. In particular, when used for high-frequency applications, $\Delta n$ is preferably 0.35 or more and more preferably 0.45 or more.

In order to control the phase difference in the high-frequency region, the dielectric anisotropy in the high-frequency region is preferably 0.5 or more. In order to perform more suitable phase control, it is necessary to increase the dielectric anisotropy in the high-frequency region. In order to perform sufficient phase control, the dielectric anisotropy is preferably 1.0 or more and more preferably 1.2 or more.

Furthermore, the composition of the disclosure can be used in elements used for controlling electromagnetic waves in a frequency range of 1 GHz to 10 THz. Examples of applications include millimeter-wave band variable phase shifters, LiDAR (light detection and ranging) elements, and antennas to which metamaterial technology is applied.

Articles containing this composition can also be used for applications other than electromagnetic wave control. By reversibly changing the orientation direction of liquid crystal molecules, it is possible to control not only the dielectric anisotropy but also the refractive index anisotropy. Examples of applications for controlling such characteristics include liquid crystal lenses and birefringent lenses for stereoscopic image display.

EXAMPLES

The disclosure will be described in more detail with reference to examples. The disclosure is not limited by these examples. The disclosure also includes a mixture of at least two compositions of the examples. The characteristics of the compositions are measured through methods described below.

Measurement methods: The characteristics were measured through the following methods. Most of these were methods disclosed in Japan Electronics and Information Technology Industries Association (hereinafter referred to as JEITA) standards (JEITA-ED-2521B) deliberated and enacted by the JEITA or modified methods thereof. A thin film transistor (TFT) was not attached to a TN element used for the measurement.

Upper limit temperature (NI; ° C.) of nematic phase:
   A sample was placed on a hot plate of a melting-point measurement device equipped with a polarizing microscope and heated at a rate of 1° C./min. The temperature when a part of the sample changed from a nematic phase to an isotropic liquid was measured.

Lower limit temperature ($T_C$; ° C.) of nematic phase:
   Samples having a nematic phase were respectively placed in glass bottles and stored in freezers at 0° C., −10° C., −20° C., −30° C. and −40° C. for 10 days, and then the liquid crystal phases were observed. For example, when a sample remained in a nematic phase at −20° C. and changed to a crystalline or a smectic phase at −30° C., the $T_C$ was described as <−20° C.

Viscosity (bulk viscosity; η; measured at 20° C.; mPa·s):
   An E-type rotational viscometer manufactured by Tokyo Keiki Inc was used for measurement.

Refractive index anisotropy (for $\Delta n<0.30$; measured at 25° C.):
   The measurement was performed with an Abbe refractometer having a polarizing plate attached to an eyepiece using light at a wavelength of 589 nm. After rubbing the surface of a main prism in one direction, a sample was added dropwise onto the main prism. The refractive index $n_\parallel$ was measured when the direction of polarization was parallel to the rubbing direction. The refractive index $n_\perp$ was measured when the direction of polarization was perpendicular to the rubbing direction. The value of refractive index anisotropy was calculated from a formula $$\Delta n = n_\parallel - n_\perp.$$

Refractive index anisotropy (for $\Delta n \geq 0.30$; measured at 25° C.):
   A sample was placed in an element composed of two glass substrates and oriented antiparallel. The thickness direction retardation (Rth) of this element was measured using a phase difference film/optical material inspection device (manufactured by Otsuka Electronics Co., Ltd., trade name: RETS-100), and the refractive index anisotropy ($\Delta n$) was calculated from the retardation value (Rth) and the gap (d: cell gap) between the glass substrates by the following equation. The wavelength of light used was 589 nm.

$$Rth = \Delta n \cdot d$$

Dielectric anisotropy (Δε; measured at 25° C.):

A sample was placed in a TN element in which the gap (cell gap) between two glass substrates was 9 μm and the twist angle was 80 degrees. A sine wave (10 V, 1 kHz) was applied to this element, and after 2 seconds, the dielectric constant ($\varepsilon_\parallel$) in the major axis direction of liquid crystal molecules was measured. A sine wave (0.5 V, 1 kHz) was applied to this element, and after 2 seconds, the dielectric constant ($\varepsilon_\perp$) in the minor axis direction of liquid crystal molecules was measured. The value of dielectric anisotropy was calculated from a formula $\Delta\varepsilon = \varepsilon_\parallel - \varepsilon_\perp$.

Dielectric anisotropy at 28 GHz (measured at room temperature):

For dielectric anisotropy at 28 GHz (Δε@28 GHz), a variable short-circuit waveguide to which a window material was attached was filled with liquid crystals through a method disclosed in Applied Optics, Vol. 44, No. 7, p. 1150 (2005) and held in a static magnetic field of 0.3 T for 3 minutes. A microwave of 28 GHz was input to the waveguide, and the amplitude ratio of a reflected wave to an incident wave was measured. The measurement was performed by changing the orientation of the static magnetic field and the tube length of the short-circuit unit to determine refractive indices (n: ne, no) and loss parameters (α: αe, αo).

For calculation of complex dielectric constants (ε', ε"), the calculated refractive indices, the loss parameters, and the following relational expressions were used.

$$\varepsilon' = n^2 - \kappa^2$$

$$\varepsilon'' = 2n\kappa$$

$$\alpha = 2\omega\kappa/c$$

Here, c is light velocity in vacuum, ω is angular velocity, and κ is an extinction coefficient. $\varepsilon'_\parallel$ and $\varepsilon'_\perp$ were respectively calculated from ne and no, and the dielectric anisotropy (Δε@28 GHz) was calculated from $\varepsilon'_\parallel - \varepsilon'_\perp$.

Dielectric loss tangent at 28 GHz (tan δ; measured at room temperature):

The dielectric loss tangent at 28 GHz (tan δ@28 GHz) was calculated from ε"/ε' using the complex dielectric constants (ε', ε"). Since anisotropy also appears in tan δ, a larger value was indicated.

Compounds in examples are represented by symbols based on the definitions in Table 2. Numbers in parentheses after the symbols correspond to compound numbers. The symbol (—) means other liquid crystalline compounds. The proportion (percentage) of the liquid crystalline compounds is weight percentage (weight %) based on the weight of a liquid crystal composition. Finally, characteristic values of the composition were summarized.

TABLE 2

| Notation of compounds using symbols $R-(A_1)-Z_1- \ldots -Z_n-(A_n)-R'$ | |
|---|---|
| 1) Left terminal group R— | Symbol |
| $C_nH_{2n+1}-$ | n— |
| $C_nH_{2n+1}O-$ | nO— |
| $C_mH_{2m+1}OC_nH_{2n}-$ | mOn— |
| $CH_2=CH-$ | V— |
| $C_nH_{2n+1}-CH=CH-$ | nV— |
| $CH_2=CH-C_nH_{2n}-$ | Vn— |
| $C_mH_{2m+1}-CH=CH-C_nH_{2n}-$ | mVn— |
| $C_nH_{2n+1}-C\equiv C-$ | nT— |

TABLE 2-continued

| Notation of compounds using symbols $R-(A_1)-Z_1- \ldots -Z_n-(A_n)-R'$ | |
|---|---|
| 2) Right terminal group —R' | Symbol |
| $-C_nH_{2n+1}$ | —n |
| $-OC_nH_{2n+1}$ | —On |
| $-CH=CH_2$ | —V |
| $-CH=CH-C_nH_{2n+1}$ | —Vn |
| $-C_nH_{2n}-CH=CH_2$ | —nV |
| $-C_nH_{2n}-CH=CH-C_mH_{2m+1}$ | —nVm |
| $-C\equiv C-C_nH_{2n+1}$ | —Tn |
| —F | —F |
| —Cl | —CL |
| —OCF$_3$ | —OCF3 |
| —CF$_3$ | —CF3 |
| —C≡N | —C |
| —C≡C—C≡N | —TC |
| —N=C=S | —NCS |
| —C≡C—CF$_3$ | —TCF3 |
| 3) Bonding group —$Z_n$— | Symbol |
| —C$_2$H$_4$— | 2 |
| —COO— | E |
| —C=CH— | V |
| —C≡C— | T |
| —C≡C—C≡C— | TT |
| —CF$_3$O— | X |
| 4) Ring structure —$A_n$— | Symbol |
|  | B |
| 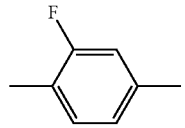 | B(2F) |
| 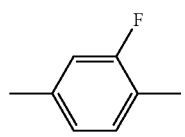 | B(F) |
| 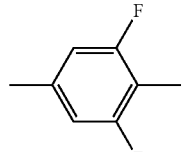 | B(F,F) |
| 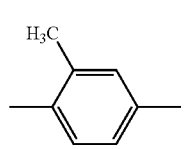 | B(2Me) |
| 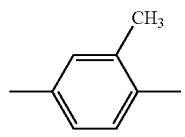 | B(Me) |

TABLE 2-continued

Notation of compounds using symbols
R—(A₁)—Z₁— ... —Zₙ—(Aₙ)—R'

| | |
|---|---|
| (structure) | B(2Me, 5Me) |
| (structure) | B(2Me, 5F) |
| (structure) | bt(Me) |
| (structure) | bt |

5) Notation example

Example 1  5—BB(F)TB(Me)—NCS

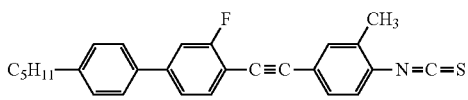

Example 2  5—B(F)TB(F)—TC

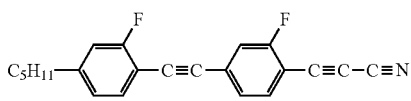

Example 3  3—BTTB—O1

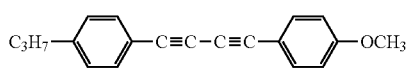

Example 4  1O—bt(Me)TB(2F)B—5

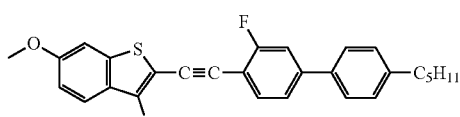

Comparative Example 1 Liquid Crystal Composition C1

| | | |
|---|---|---|
| 5-B(F)TB(F)-TC | (2-1) | 15% |
| 5-B(Me)TB(F)-TC | (2-1) | 15% |
| 5-BTB(F)TB-2 | (3-3) | 10% |
| 5-BTB(F)TB-3 | (3-3) | 10% |
| 3-BTTB-O1 | (3-5) | 15% |
| 5-BTTB-O1 | (3-5) | 15% |
| 2O-btTB-3 | (—) | 20% |

NI = 128.3° C.;
Δn = 0.44;
Δε = 12.3

The dielectric anisotropy (Δε@28 GHz) and dielectric loss tangent (tan δ@28 GHz) at 28 GHz of the liquid crystal composition C1 were as follows.

Δε@28 GHz=1.04 tan δ@28 GHz=0.014

Comparative Example 2 Liquid Crystal Composition C2

| | | |
|---|---|---|
| 5-B(F)TB(F)-TC | (2-1) | 15% |
| 5-BTB(F)TB-2 | (3-3) | 10% |
| 5-BTB(F)TB-3 | (3-3) | 10% |
| 3-BTB(F,F)-NCS | (3-4) | 10% |
| 3-BTB(F)-NCS | (3-4) | 5% |
| 3-BTTB-O1 | (3-5) | 15% |
| 5-BTTB-O1 | (3-5) | 15% |
| 2O-btTB-3 | (—) | 20% |

NI = 121.5° C.;
Δn = 0.43;
Δε = 9.7

The dielectric anisotropy (Δε@28 GHz) and dielectric loss tangent (tan δ@28 GHz) at 28 GHz of the liquid crystal composition C2 were as follows.

Δε@28 GHz=1.06 tan δ@28 GHz=0.014

Comparative Example 3 Liquid Crystal Composition C3

| | | |
|---|---|---|
| 4-BTB(F,F)-TC | (2-1) | 5% |
| 5-BTB(F,F)-TC | (2-1) | 5% |
| 5-B(F)TB(F)-TC | (2-1) | 10% |
| 5-B(F)TB-TC | (2-1) | 5% |
| 3-BB(F)TB-TC | (2-3) | 8% |
| 5-BB(F)TB-TC | (2-3) | 7% |
| 5-BTB(F)TB-3 | (3-3) | 10% |
| 2-BTB-O1 | (3-4) | 2% |
| 3-BTB-O1 | (3-4) | 2% |
| 4-BTB-O1 | (3-4) | 2% |
| 4-BTB-O2 | (3-4) | 2% |
| 5-BTB-O1 | (3-4) | 2% |
| 3-BTTB-O1 | (3-5) | 15% |
| 5-BTTB-O1 | (3-5) | 15% |
| 2O-btTB-3 | (—) | 10% |

NI = 147.3° C.;
Δn = 0.46;
Δε = 15.5

The dielectric anisotropy (Δε@28 GHz) and dielectric loss tangent (tan δ@28 GHz) at 28 GHz of the liquid crystal composition C3 were as follows.

Δε@28 GHz=1.08 tan δ@28 GHz=0.014

Comparative Example 4 Liquid Crystal Composition C4

| | | |
|---|---|---|
| 5-B(F)TB(F)-TC | (2-1) | 10% |
| 5-B(F)TB(Me)-TC | (2-1) | 10% |
| 5-BB(F)TB-TC | (2-3) | 15% |
| 5-BTB(F)TB-2 | (3-3) | 10% |
| 3-BTTB-O1 | (3-5) | 10% |
| 5-BTTB-O1 | (3-5) | 10% |
| 1O-bt(Me)TB-3 | (—) | 10% |
| 1O-bt(Me)TBB-3 | (—) | 5% |
| 1O-bt(Me)TB(2F)B-5 | (—) | 20% |

NI = 178.6° C.;
Δn = 0.47;
Δε = 9.0

The dielectric anisotropy (Δε@28 GHz) and dielectric loss tangent (tan δ@28 GHz) at 28 GHz of the liquid crystal composition C4 were as follows.

Δε@28 GHz=1.08 tan δ@28 GHz=0.014

Example 1 Liquid Crystal Composition M1

| | | |
|---|---|---|
| 5-BB(F)TB(2Me)B(F,F)-NCS | (1-5) | 10% |
| 5-B(F)TB(F)-TC | (2-1) | 10% |
| 5-B(F)TB(Me)-TC | (2-1) | 10% |
| 5-BB(F)TB-TC | (2-3) | 15% |
| 3-BTTB-O1 | (3-5) | 10% |
| 5-BTTB-O1 | (3-5) | 10% |
| 1O-bt(Me)TB-3 | (—) | 10% |
| 1O-bt(Me)TBB-3 | (—) | 5% |
| 1O-bt(Me)TB(2F)B-5 | (—) | 20% |

NI = 182.6° C.;
Δn = 0.49;
Δε = 8.4

The dielectric anisotropy (Δε@28 GHz) and dielectric loss tangent (tan δ@28 GHz) at 28 GHz of the liquid crystal composition M1 were as follows.

Δε@28 GHz=1.14 tan δ@28 GHz=0.013

Example 2 Liquid Crystal Composition M2

| | | |
|---|---|---|
| 3-BTB(2Me)-NCS | (1-1) | 5% |
| 5-B(F)TB(F)-TC | (2-1) | 10% |
| 5-B(F)TB(Me)-TC | (2-1) | 10% |
| 5-BB(F)TB-TC | (2-3) | 15% |
| 5-BB(F)TB(F)-NCS | (3-2) | 10% |
| 3-BTTB-O1 | (3-5) | 10% |
| 5-BTTB-O1 | (3-5) | 10% |
| 1O-bt(Me)TBB-3 | (—) | 10% |
| 1O-bt(Me)TB(2F)B-5 | (—) | 20% |

NI = 186.5° C.;
Δn = 0.50;
Δε = 10.9

Δε@28 GHz=1.17 tan δ@28 GHz=0.013

Example 3 Liquid Crystal Composition M3

| | | |
|---|---|---|
| 3-BTB(2Me)-NCS | (1-1) | 10% |
| 5-B(F)TB(F)-TC | (2-1) | 10% |
| 5-B(F)TB(Me)-TC | (2-1) | 10% |
| 5-BB(F)TB-TC | (2-3) | 15% |
| 5-BTB(F)TB-2 | (3-3) | 10% |
| 3-BTTB-O1 | (3-5) | 10% |
| 5-BTTB-O1 | (3-5) | 10% |
| 1O-bt(Me)TBB-3 | (—) | 5% |
| 1O-bt(Me)TB(2F)B-5 | (—) | 20% |

NI = 172.4° C.;
Δn = 0.49;
Δε = 10.7

The dielectric anisotropy (Δε@28 GHz) and dielectric loss tangent (tan δ@28 GHz) at 28 GHz of the liquid crystal composition M3 were as follows.

Δε@28 GHz=1.12 tan δ@28 GHz=0.013

Example 4 Liquid Crystal Composition M4

| | | |
|---|---|---|
| 3-BTB(2Me)-NCS | (1-1) | 10% |
| 5-BB(F)TB(2Me)-NCS | (1-2) | 10% |
| 5-B(F)TB(F)-TC | (2-1) | 10% |
| 5-BTB(F)-TC | (2-1) | 10% |
| 5-BB(F)TB-TC | (2-3) | 15% |
| 3-BTTB-O1 | (3-5) | 10% |
| 5-BTTB-O1 | (3-5) | 10% |
| 1O-bt(Me)TB(2F)B-5 | (—) | 25% |

NI = 170.7° C.;
Δn = 0.49;
Δε = 13.4

The dielectric anisotropy (Δε@28 GHz) and dielectric loss tangent (tan δ@28 GHz) at 28 GHz of the liquid crystal composition M4 were as follows.

Δε@28 GHz=1.14 tan δ@28 GHz=0.012

Example 5 Liquid Crystal Composition M5

| | | |
|---|---|---|
| 3-BTB(2Me)-NCS | (1-1) | 16% |
| 5-BB(F)TB(2Me)B(F,F)-NCS | (1-5) | 11% |
| 5-BTB(F)-TC | (2-1) | 16% |
| 5-BB(F)TB-TC | (2-3) | 16% |
| 3-BTTB-O1 | (3-5) | 16% |
| 1O-bt(Me)TB(2F)B-5 | (—) | 25% |

NI = 184.0° C.;
Δn = 0.51;
Δε = 10.5

The dielectric anisotropy (Δε@28 GHz) and dielectric loss tangent (tan δ@28 GHz) at 28 GHz of the liquid crystal composition M5 were as follows.

Δε@28 GHz=1.19 tan δ@28 GHz=0.012

Example 6 Liquid Crystal Composition M6

| | | |
|---|---|---|
| 5-BB(F)TB(Me)-NCS | (1-2) | 10% |
| 5-BB(F)TB(2Me)B(F,F)-NCS | (1-5) | 10% |
| 5-B(F)TB(F)-TC | (2-1) | 10% |
| 5-BTB(F)-TC | (2-1) | 10% |
| 5-BB(F)TB-TC | (2-3) | 15% |
| 3-BTTB-O1 | (3-5) | 10% |
| 5-BTTB-O1 | (3-5) | 10% |
| 1O-bt(Me)TBB-3 | (—) | 5% |
| 1O-bt(Me)TB(2F)B-5 | (—) | 20% |

NI = 202.4° C.;
Δn = 0.51;
Δε = 10.9

The dielectric anisotropy (Δε@28 GHz) and dielectric loss tangent (tan δ@28 GHz) at 28 GHz of the liquid crystal composition M6 were as follows.

Δε@28 GHz=1.19 tan δ@28 GHz=0.012

Example 7 Liquid Crystal Composition M7

| | | |
|---|---|---|
| 3-BTB(2Me)-NCS | (1-1) | 10% |
| 5-BB(F)TB(Me)-NCS | (1-2) | 10% |
| 5-B(F)TB(F)-TC | (2-1) | 10% |
| 5-BTB(F)-TC | (2-1) | 10% |
| 5-BB(F)TB-TC | (2-3) | 15% |
| 3-BTTB-O1 | (3-5) | 10% |
| 5-BTTB-O1 | (3-5) | 10% |
| 1O-bt(Me)TB(2F)B-5 | (—) | 25% |

NI = 173.6° C.;
Δn = 0.50;
Δε = 13.1

The dielectric anisotropy (Δε@28 GHz) and dielectric loss tangent (tan δ@28 GHz) at 28 GHz of the liquid crystal composition M7 were as follows.

Δε@28 GHz=1.18 tan δ@28 GHz=0.013

Example 8 Liquid Crystal Composition M8

| | | |
|---|---|---|
| 3-BTB(2Me)-NCS | (1-1) | 10% |
| 5-BTB(2Me)-NCS | (1-1) | 10% |
| 5-BB(F)TB(2Me)-NCS | (1-2) | 10% |
| 5-BB(F)TB(Me)-NCS | (1-2) | 10% |
| 5-BB(F)TB(2Me,5Me)-NCS | (1-2) | 10% |
| 5-B(F)TB(F)-TC | (2-1) | 12% |
| 5-BTB(F)-TC | (2-1) | 13% |
| 3-BB(F)TB-TC | (2-3) | 13% |
| 5-BB(F)TB-TC | (2-3) | 12% |

NI = 166.1° C.;
Δn = 0.52;
Δε = 20.5

The dielectric anisotropy (Δε@28 GHz) and dielectric loss tangent (tan δ@28 GHz) at 28 GHz of the liquid crystal composition M8 were as follows.

Δε@28 GHz=1.34 tan δ@28 GHz=0.011

Example 9 Liquid Crystal Composition M9

| | | |
|---|---|---|
| 5-BTB(2Me)-NCS | (1-1) | 20% |
| 5-BB(F)TB(2Me)-NCS | (1-2) | 10% |
| 5-BB(F)TB(Me)-NCS | (1-2) | 10% |
| 3-BB(F)TB-TC | (2-3) | 10% |
| 5-BB(F)TB-TC | (2-3) | 10% |
| 3-BTB(Me)-NCS | (—) | 20% |
| 5-BTB(Me)-NCS | (—) | 20% |

NI = 91.5° C.;
Δn = 0.45;
Δε = 15.3

The dielectric anisotropy (Δε@28 GHz) and dielectric loss tangent (tan δ@28 GHz) at 28 GHz of the liquid crystal composition M9 were as follows.

Δε@28 GHz=1.24 tan δ@28 GHz=0.008

Example 10 Liquid Crystal Composition M10

| | | |
|---|---|---|
| 3-BTB(2Me)-NCS | (1-1) | 10% |
| 5-BTB(2Me)-NCS | (1-1) | 10% |
| 5-BB(F)TB(2Me)-NCS | (1-2) | 10% |
| 5-BB(F)TB(2Me,5Me)-NCS | (1-2) | 10% |
| 5-B(F)TB(F)-TC | (2-1) | 12% |
| 5-BTB(F)-TC | (2-1) | 13% |
| 5-BB(F)TB-TC | (2-3) | 15% |
| 1O-bt(Me)TB(2F)B-5 | (—) | 20% |

NI = 159.2° C.;
Δn = 0.49;
Δε = 17.4

The dielectric anisotropy (Δε@28 GHz) and dielectric loss tangent (tan δ@28 GHz) at 28 GHz of the liquid crystal composition M10 were as follows.

Δε@28 GHz=1.20 tan δ@28 GHz=0.011

Example 11 Liquid Crystal Composition M11

| | | |
|---|---|---|
| 3-BTB(2Me)-NCS | (1-1) | 15% |
| 5-BTB(2Me)-NCS | (1-1) | 10% |
| 3-BTB(2Me,5Me)-NCS | (1-1) | 15% |
| 5-BB(F)TB(2Me)-NCS | (1-2) | 10% |
| 5-BB(F)TB(2Me,5Me)-NCS | (1-2) | 10% |
| 5-B(F)TB(F)-TC | (2-1) | 10% |
| 5-BTB(F)-TC | (2-1) | 10% |
| 5-BB(F)TB-TC | (2-3) | 10% |
| 5-BB(F)TB(F)-TC | (2-3) | 10% |

NI = 110.2° C.;
Δn = 0.47;
Δε = 20.5

The dielectric anisotropy (Δε@28 GHz) and dielectric loss tangent (tan δ@28 GHz) at 28 GHz of the liquid crystal composition M11 were as follows.

Δε@28 GHz=1.22 tan δ@28 GHz=0.011

Example 12 Liquid Crystal Composition M12

| | | |
|---|---|---|
| 3-BTB(2Me,5Me)-NCS | (1-1) | 15% |
| 5-BB(F)TB(Me)-NCS | (1-2) | 13% |
| 5-BB(F)TB(2Me,5Me)-NCS | (1-2) | 10% |
| 5-B(F)TB(F)-TC | (2-1) | 10% |
| 5-BTB(F)-TC | (2-1) | 10% |
| 5-BB(F)TB-TC | (2-3) | 10% |
| 5-BB(F)TB(F)-TC | (2-3) | 10% |
| 3-BTB(Me)-NCS | (—) | 14% |
| 5-BTB(Me)-NCS | (—) | 8% |

NI = 112.6° C.;
Δn = 0.48;
Δε = 22.3

The dielectric anisotropy (Δε@28 GHz) and dielectric loss tangent (tan δ@28 GHz) at 28 GHz of the liquid crystal composition M12 were as follows.

Δε@28 GHz=1.21 tan δ@28 GHz=0.010

Example 13 Liquid Crystal Composition M13

| | | |
|---|---|---|
| 3-BTB(2Me)-NCS | (1-1) | 20% |
| 5-BTB(2Me)-NCS | (1-1) | 20% |
| 5-BB(F)TB(Me)-NCS | (1-2) | 15% |
| 5-BB(F)TB(2Me,5Me)-NCS | (1-2) | 10% |
| 5-B(F)TB(F)-TC | (2-1) | 10% |
| 5-BTB(F)-TC | (2-1) | 10% |
| 5-BB(F)TB-TC | (2-3) | 8% |
| 5-BB(F)TB(F)-TC | (2-3) | 7% |

NI = 115.0° C.;
Δn = 0.48;
Δε = 19.0

The dielectric anisotropy (Δε@28 GHz) and dielectric loss tangent (tan δ@28 GHz) at 28 GHz of the liquid crystal composition M13 were as follows.

Δε@28 GHz=1.25 tan δ@28 GHz=0.010

Example 14 Liquid Crystal Composition M14

| | | |
|---|---|---|
| 3-BTB(2Me)-NCS | (1-1) | 20% |
| 5-BTB(2Me)-NCS | (1-1) | 10% |
| 5-BB(F)TB(Me)-NCS | (1-2) | 15% |
| 5-BB(F)TB(2Me,5Me)-NCS | (1-2) | 10% |
| 5-B(F)TB(F)-TC | (2-1) | 10% |
| 5-BTB(F)-TC | (2-1) | 10% |
| 5-BB(F)TB-TC | (2-3) | 8% |
| 5-BB(F)TB(F)-TC | (2-3) | 7% |
| 1O-bt(Me)TB(2F)B-5 | (—) | 10% |

NI = 137.4° C.;
Δn = 0.49;
Δε = 18.8

The dielectric anisotropy (Δε@28 GHz) and dielectric loss tangent (tan δ@28 GHz) at 28 GHz of the liquid crystal composition M14 were as follows.

Δε@28 GHz=1.22 tan δ@28 GHz=0.011

Example 15 Liquid Crystal Composition M15

| | | |
|---|---|---|
| 3-BTB(2Me)-NCS | (1-1) | 15% |
| 5-BTB(2Me)-NCS | (1-1) | 15% |
| 5-BB(F)TB(Me)-NCS | (1-2) | 10% |
| 5-BB(F)TB(2Me,5Me)-NCS | (1-2) | 10% |
| 5-B(F)TB(F)-TC | (2-1) | 10% |
| 5-BTB(F)-TC | (2-1) | 15% |
| 5-BB(F)TB-TC | (2-3) | 8% |
| 5-BB(F)TB(F)-TC | (2-3) | 7% |
| 1O-bt(Me)TB(2F)B-5 | (—) | 10% |

NI = 135.0° C.;
Δn = 0.49;
Δε = 19.4

The dielectric anisotropy (Δε@28 GHz) and dielectric loss tangent (tan δ@28 GHz) at 28 GHz of the liquid crystal composition M15 were as follows.

Δε@28 GHz=1.21 tan δ@28 GHz=0.010

Example 16 Liquid Crystal Composition M16

| | | |
|---|---|---|
| 5-BB(F)TB(2Me)-NCS | (1-2) | 11% |
| 4-BB(F)TB(Me)-NCS | (1-2) | 11% |
| 5-BB(F)TB(2Me,5Me)-NCS | (1-2) | 12% |
| 3-BB(F)B(F,F)-NCS | (3-1) | 10% |
| 5-BB(F)TB(F)-NCS | (3-2) | 10% |
| 5-BB(F)TB(F,F)-NCS | (3-2) | 10% |
| 3-BTB(F,F)-NCS | (3-4) | 10% |
| 5-BTB(F,F)-NCS | (3-4) | 10% |
| 3-BTB(Me)-NCS | (—) | 8% |
| 5-BTB(Me)-NCS | (—) | 8% |

NI = 111.2° C.;
Δn = 0.46;
Δε = 17.0

The dielectric anisotropy (Δε@28 GHz) and dielectric loss tangent (tan δ@28 GHz) at 28 GHz of the liquid crystal composition M16 were as follows.

Δε@28 GHz=1.29 tan δ@28 GHz=0.009

Example 17 Liquid Crystal Composition M17

| | | |
|---|---|---|
| 3-BTB(2Me)-NCS | (1-1) | 20% |
| 5-BTB(2Me)-NCS | (1-1) | 10% |
| 5-BB(F)TB(Me)-NCS | (1-2) | 10% |
| 5-BB(F)TB(2Me,5Me)-NCS | (1-2) | 10% |
| 5-B(F)TB(F)-TC | (2-1) | 10% |
| 5-BTB(F)-TC | (2-1) | 10% |
| 5-BB(F)TB-TC | (2-3) | 10% |
| 5-BB(F)TB(F)-TC | (2-3) | 10% |
| 1O-bt(Me)TB(2F)B-5 | (—) | 10% |

NI = 146.8° C.;
Δn = 0.50;
Δε = 18.9

The dielectric anisotropy ($\Delta\varepsilon$@28 GHz) and dielectric loss tangent (tan $\delta$@28 GHz) at 28 GHz of the liquid crystal composition M17 were as follows.

$\Delta\varepsilon$@28 GHz=1.24 tan $\delta$@28 GHz=0.011

Example 18 Liquid Crystal Composition M18

| | | |
|---|---|---|
| 3-BTB(2Me)-NCS | (1-1) | 25% |
| 5-BTB(2Me)-NCS | (1-1) | 10% |
| 3-BB(F)TB(Me)-NCS | (1-2) | 7.5% |
| 5-BB(F)TB(Me)-NCS | (1-2) | 7.5% |
| 5-BB(F)TB(2Me,5Me)-NCS | (1-2) | 10% |
| 5-BTB(F)-TC | (2-1) | 15% |
| 3-BB(F)TB-TC | (2-3) | 10% |
| 3-BB(F)B(F,F)-NCS | (3-1) | 15% |

NI = 119.3° C.;
$\Delta$n = 0.48;
$\Delta\varepsilon$ = 20.4

The dielectric anisotropy ($\Delta\varepsilon$@28 GHz) and dielectric loss tangent (tan $\delta$@28 GHz) at 28 GHz of the liquid crystal composition M18 were as follows.

$\Delta\varepsilon$@28 GHz=1.28 tan $\delta$@28 GHz=0.009

Example 19 Liquid Crystal Composition M19

| | | |
|---|---|---|
| 3-BTB(2Me)-NCS | (1-1) | 20% |
| 5-BTB(2Me)-NCS | (1-1) | 10% |
| 3-BB(F)TB(Me)-NCS | (1-2) | 7.5% |
| 5-BB(F)TB(Me)-NCS | (1-2) | 7.5% |
| 5-BB(F)TB(2Me,5Me)-NCS | (1-2) | 10% |
| 3-BB(F)TB-TC | (2-3) | 10% |
| 5-BB(F)TB-TC | (2-3) | 5% |
| 3-BB(F)B(F,F)-NCS | (3-1) | 20% |
| 5-BTB(Me)-NCS | (—) | 10% |

NI = 123.0° C.;
$\Delta$n = 0.48;
$\Delta\varepsilon$ = 18.7

The dielectric anisotropy ($\Delta\varepsilon$@28 GHz) and dielectric loss tangent (tan $\delta$@28 GHz) at 28 GHz of the liquid crystal composition M19 were as follows.

$\Delta\varepsilon$@28 GHz=1.30 tan $\delta$@28 GHz=0.009

Example 20 Liquid Crystal Composition M20

| | | |
|---|---|---|
| 3-BTB(2Me)-NCS | (1-1) | 20% |
| 5-BTB(2Me)-NCS | (1-1) | 10% |
| 5-BB(F)TB(Me)-NCS | (1-2) | 5% |
| 5-BTB(2Me,5F)B(F,F)-NCS | (1-3) | 10% |
| 5-BTB(F)-TC | (2-1) | 5% |
| 3-BB(F)TB-TC | (2-3) | 10% |
| 3-BB(F)B(F,F)-NCS | (3-1) | 20% |
| 5-BTB(2F)B(F)-NCS | (3-6) | 10% |
| 5-BTB(Me)-NCS | (—) | 10% |

NI = 115.4° C.;
$\Delta$n = 0.46;
$\Delta\varepsilon$ = 18.8

The dielectric anisotropy ($\Delta\varepsilon$@28 GHz) and dielectric loss tangent (tan $\delta$@28 GHz) at 28 GHz of the liquid crystal composition M20 were as follows.

$\Delta\varepsilon$@28 GHz=1.30 tan $\delta$@28 GHz=0.010

Example 21 Liquid Crystal Composition M21

| | | |
|---|---|---|
| 3-BTB(2Me)-NCS | (1-1) | 20% |
| 5-BTB(2Me)-NCS | (1-1) | 10% |
| 3-BB(F)TB(Me)-NCS | (1-2) | 10% |
| 5-BB(F)TB(Me)-NCS | (1-2) | 10% |
| 5-BB(F)TB(2Me,5Me)-NCS | (1-2) | 10% |
| 5-B(F)TB(F)-TC | (2-1) | 10% |
| 5-BTB(F)-TC | (2-1) | 15% |
| 3-BB(F)TB-TC | (2-3) | 10% |
| 5-BB(F)TB-TC | (2-3) | 5% |

NI = 131.5° C.;
$\Delta$n = 0.50° C.
$\Delta\varepsilon$ = 21.0

The dielectric anisotropy ($\Delta\varepsilon$@28 GHz) and dielectric loss tangent (tan $\delta$@28 GHz) at 28 GHz of the liquid crystal composition M21 were as follows.

$\Delta\varepsilon$@28 GHz=1.29 tan $\delta$@28 GHz=0.008

A composition in which the compound represented by Formula (3-3) in Comparative Example 4 is changed to the compound represented by Formula (1-5) is Example 1. Here, the refractive index anisotropy ($\Delta$n) of the composition of Comparative Example 4 was 0.47, and $\Delta$n of the composition of Example 1 was 0.49. From this, it was confirmed that the compound (1) had an effect of increasing $\Delta$n.

The $\Delta\varepsilon$@28 GHz values of the compositions of Comparative Examples 1 to 4 were 1.04 to 1.08, and tan $\delta$@28 GHz was 0.014. On the other hand, the $\Delta\varepsilon$@28 GHz values of the compositions of Examples 1 to 21 were 1.12 to 1.34, and the tan $\delta$@28 GHz values were 0.008 to 0.013.

The tan $\delta$@28 GHz values of Examples 1 to 21 are values smaller than those of Comparative Examples 1 to 4.

The compositions of Examples 1 to 21 contain the compound (1). The dielectric anisotropy at high frequencies increases as the amount of such compounds as components of a composition increases. On the other hand, the tan $\delta$@28 GHz value becomes smaller.

In the liquid crystal compositions using the compound (1), $\Delta$n at 589 nm could be increased while maintaining basic performance of the liquid crystal composition to relatively increase $\Delta\varepsilon$@28 GHz while the tan $\delta$@28 GHz value is kept small.

The characteristics required of a liquid crystal composition are: a large dielectric anisotropy ($\Delta\varepsilon$) that enables large phase control in a frequency region used for phase control; and a small dielectric loss tangent (tan $\delta$) proportional to absorption energy of electromagnetic wave signals of the liquid crystal composition. The results of the examples and comparative examples prove that the composition of the disclosure has a large dielectric anisotropy (Δε@28 GHz) and a small dielectric loss tangent (tan δ@28 GHz). In general, the smaller the tan δ, the lower the absorption energy of electromagnetic waves. Accordingly, the liquid crystal composition using the compounds represented by Formula (1) can reduce the absorption energy of electromagnetic wave signals and can set the loss of electromagnetic wave signals to be smaller. From the above, it can be concluded that the liquid crystal composition of the disclosure can transmit electromagnetic wave signals more efficiently.

The liquid crystal composition of the disclosure satisfies at least one of characteristics such as: a high upper limit temperature of a nematic phase; a low lower limit temperature of a nematic phase; a low viscosity; a large refractive index anisotropy, a large dielectric anisotropy, and a small dielectric loss tangent in the frequency region for controlling electromagnetic wave signals; and a large dielectric anisotropy at low frequencies for reducing drive voltage, or has an appropriate balance with respect to at least two characteristics. An element containing such a composition can be used for controlling electromagnetic wave signals in a frequency range of 1 GHz to 10 THz.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A liquid crystal composition comprising:
at least one compound represented by Formula (1), at least one compound represented by Formula (2); and at least one compound selected from the group consisting of compounds represented by Formulae (3-1) to (3-6),

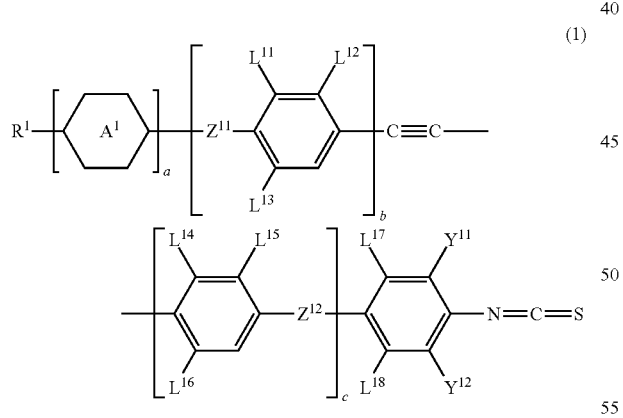

in Formula (1),
$R^1$ is C1-12 alkyl, and in this alkyl, at least one —$CH_2$— may be substituted with —CH=CH— or —C≡C—;
a ring $A^1$ is 1,4-cyclohexylene, 1,4-cyclohexenylene, tetrahydropyran-2,5-diyl, 1,3-dioxane-2,5-diyl, pyrimidine-2,5-diyl, 2,6,7-trioxabicyclo[2.2.2]octane-1,4-diyl, naphthalene-2,6-diyl, or pyridine-2,5-diyl, at least one hydrogen on these rings may be substituted with a halogen or C1-3 alkyl;
$Z^{11}$ and $Z^{12}$ are a single bond, —CH=CH—, —CF=CF—, —C≡C—, or —C≡C—C≡C—;

$L^{11}$, $L^{12}$, $L^{13}$, $L^{14}$, $L^{15}$, $L^{16}$, $L^{17}$, and $L^{18}$ are hydrogen, a halogen, C1-3 alkyl, or C3-5 cycloalkyl;
$Y^{11}$ is hydrogen, a halogen, or C1-3 alkyl;
$Y^{12}$ is hydrogen or a halogen;
at least one of $L^{14}$, $L^{15}$, $L^{16}$, $L^{17}$, $L^{18}$, and $Y^{11}$ is C1-3 alkyl; and
a and c are 0 or 1, b is 0, 1, or 2, and a sum of a, b, and c is 1 to 3, where when a is 0, b is 1, c is 0, $Z^{11}$ is a single bond, and $L^{11}$, $L^{12}$, $L^{13}$, $L^{17}$, $L^{18}$, and $Y^{12}$ are hydrogen, $Y^{11}$ is not methyl,

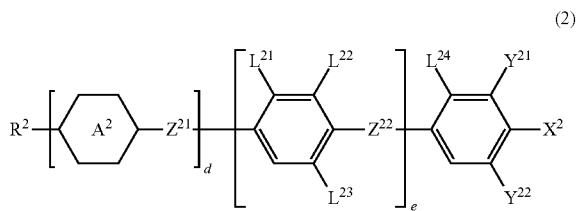

in Formula (2),
$R^2$ is hydrogen, a halogen, or C1-12 alkyl in which at least one —$CH_2$— may be substituted with —O— or —S— and at least one —$(CH_2)_2$— may be substituted with —CH=CH— or —C≡C—, and at least one hydrogen in these groups may be substituted with a halogen;
a ring $A^2$ is 1,4-cyclohexylene, 1,4-cyclohexenylene, tetrahydropyran-2,5-diyl, 1,3-dioxane-2,5-diyl, pyrimidine-2,5-diyl, 2,6,7-trioxabicyclo[2.2.2]octane-1,4-diyl, naphthalene-2,6-diyl, or pyridine-2,5-diyl, at least one hydrogen on these rings may be substituted with a halogen or C1-3 alkyl;
$Z^{21}$ and $Z^{22}$ are a single bond, —C≡C— or —C≡C—C≡C—;
$L^{21}$, $L^{22}$, $L^{23}$, and $L^{24}$ are hydrogen, a halogen, C1-3 alkyl, or C3-5 cycloalkyl;
$X^2$ is —C≡C—$CF_3$ or —C≡C—C≡N;
$Y^{21}$ and $Y^{22}$ are hydrogen, a halogen, or C1-3 alkyl; and
d is 0 or 1, e is 0, 1, 2, or 3, and a sum of d and e is 1 to 3, and

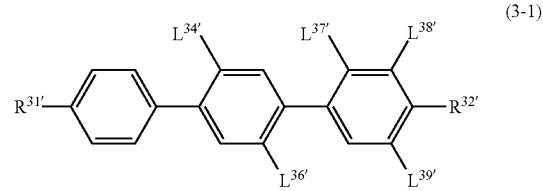

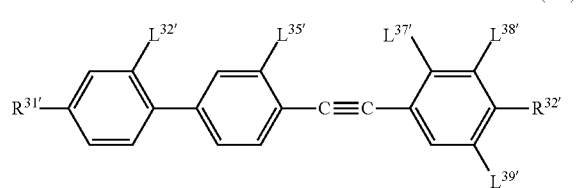

-continued

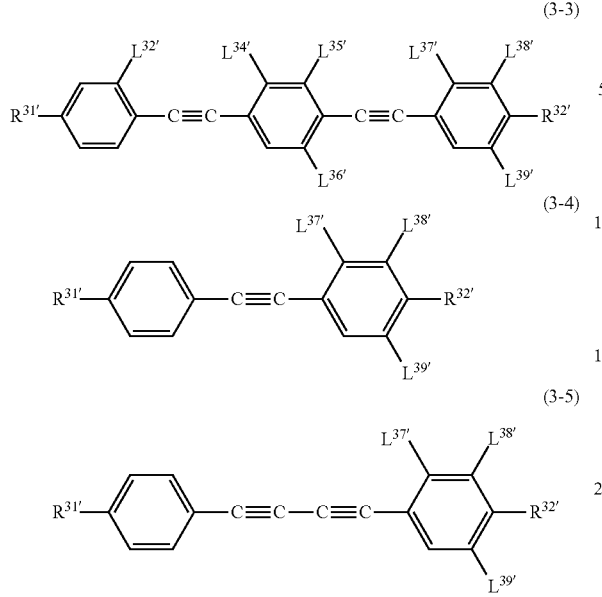

(3-3)

(3-4)

(3-5)

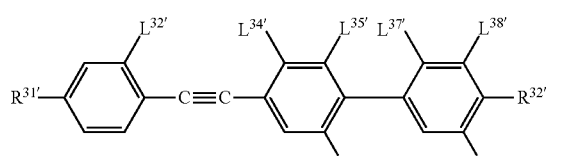

(3-6)

in Formulae (3-1) to (3-6),
$R^{31'}$ is C1-12 alkyl, and in this alkyl, at least one —CH$_2$— may be substituted with —O— and at least one —(CH$_2$)$_2$— may be substituted with —CH=CH— or —C≡C—;
$R^{32'}$ is $R^{31'}$ or —N=C=S;
$L^{32'}$, $L^{34'}$, $L^{35'}$, $L^{36'}$, $L^{37'}$, $L^{38'}$, and $L^{39'}$ are hydrogen, fluorine, or chlorine; and
in Formula (3-6), when $L^{35'}$, $L^{36'}$, $L^{38'}$, and $L^{39'}$ are hydrogen, $R^{32'}$ is —N=C=S.

2. A liquid crystal composition according to claim 1, comprising:
at least one compound selected from the group consisting of compounds represented by Formulae (1-1) to (1-6) as the compound represented by Formula (1),

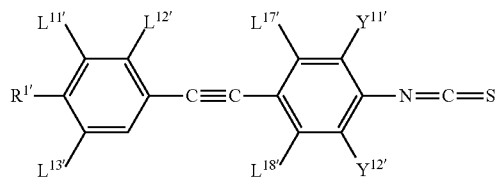

(1-1)

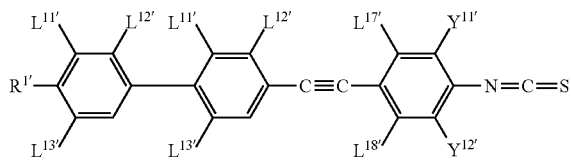

(1-2)

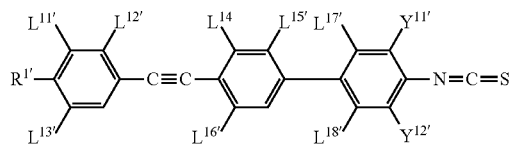

(1-3)

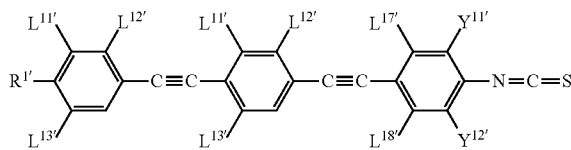

(1-4)

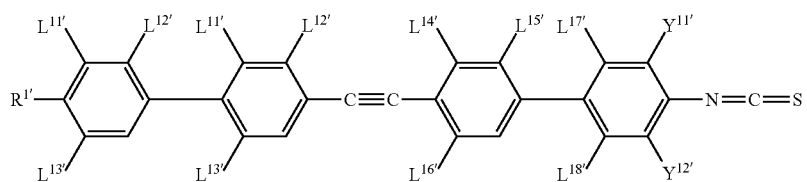

(1-5)

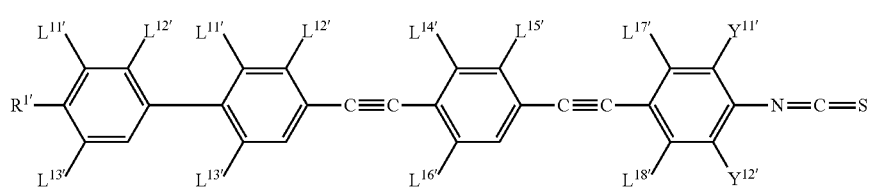

(1-6)

in Formulae (1-1) to (1-6), $R^{1'}$ is C1-12 alkyl, and in this alkyl, at least one —(CH$_2$)$_2$— may be substituted with —CH=CH— or —C≡C—;

$L^{11'}$, $L^{12'}$, $L^{13'}$, $L^{14'}$, $L^{15'}$, $L^{16'}$, $L^{17'}$, and $L^{18'}$ are hydrogen, fluorine, chlorine, methyl, ethyl, or cyclopropyl;

$Y^{11'}$ is hydrogen, fluorine, chlorine, methyl, or ethyl;

$Y^{12'}$ is hydrogen, fluorine, or chlorine;

at least one of $L^{14'}$, $L^{15'}$, $L^{16'}$, $L^{17'}$, $L^{18'}$, and $Y^{11'}$ is methyl or ethyl; and here, in Formula (1-1), when $L^{11'}$, $L^{12'}$, $L^{13'}$, $L^{17'}$, $L^{18'}$, and $Y^{12'}$ are hydrogen, $Y^{11'}$ is not methyl.

3. The liquid crystal composition according to claim 1, wherein a proportion of the compounds represented by Formula (1) is within a range of 5 weight % to 80 weight % based on a weight of the liquid crystal composition.

4. The liquid crystal composition according to claim 1, comprising:

at least one compound selected from the group consisting of compounds represented by Formulae (2-1) to (2-8) as the compound represented by Formula (2),

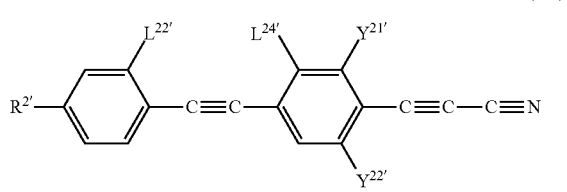
(2-1)

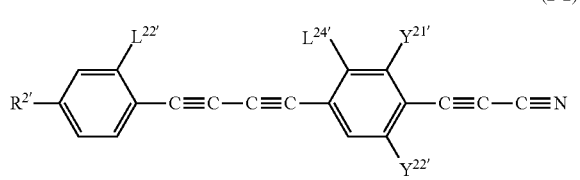
(2-2)

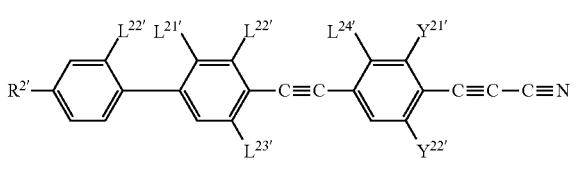
(2-3)

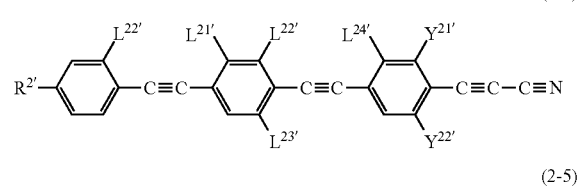
(2-4)

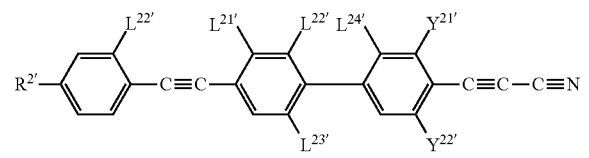
(2-5)

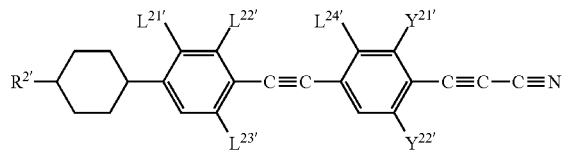
(2-6)

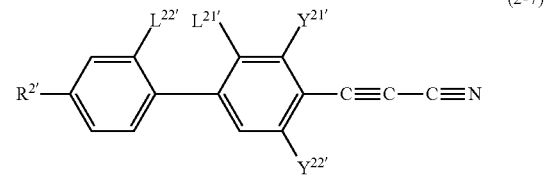
(2-7)

(2-8)

in Formulae (2-1) to (2-8), $R^{2'}$ is C1-12 alkyl, and in this alkyl, at least one —(CH$_2$)$_2$— may be substituted with —CH=CH— or —C≡C—;

$L^{21'}$, $L^{22'}$, $L^{23'}$, and $L^{24'}$ are hydrogen, fluorine, chlorine, methyl, ethyl, or cyclopropyl; and $Y^{21'}$ and $Y^{22'}$ are hydrogen, fluorine, chlorine, methyl, or ethyl.

5. The liquid crystal composition according to claim 1, wherein a proportion of the compounds represented by Formula (2) is within a range of 5 weight % to 50 weight % based on a weight of the liquid crystal composition.

6. The liquid crystal composition according to claim 1, wherein a proportion of the compounds represented by Formulae (3-1) to (3-6) is within a range of 5 weight % to 50 weight % based on a weight of the liquid crystal composition.

7. The liquid crystal composition according to claim 1, wherein refractive index anisotropy at 25° C. at a wavelength of 589 nm is 0.35 or more.

8. The liquid crystal composition according to claim 1, wherein dielectric anisotropy at 25° C. in a frequency range below 1 MHz is 5 or more.

9. The liquid crystal composition according to claim 1, wherein dielectric anisotropy at 25° C. at at least one frequency from 1 GHz to 10 THz is within a range of 0.50 to 3.0.

10. The liquid crystal composition according to claim 1, further comprising:

an optically active compound.

11. The liquid crystal composition according to claim 1, further comprising:

a polymerizable compound.

12. The liquid crystal composition according to claim 1, further comprising:

at least one of an antioxidant, an ultraviolet absorber, an antistatic agent, and a dichroic dye.

13. An element comprising:

the liquid crystal composition according to claim 1, wherein the element is used for switching and is capable of reversibly controlling a dielectric constant by reversibly changing an orientation direction of liquid crystal molecules.

14. An element comprising:
the liquid crystal composition according to claim 1,
wherein the element is used for controlling electromagnetic waves in a frequency range from 1 GHz to 10 THz.

15. A liquid crystal lens, comprising:
the liquid crystal composition according to claim 1.

16. A birefringent lens for stereoscopic image display, comprising:
the liquid crystal composition according to claim 1.

* * * * *